(12) United States Patent
Gowda et al.

(10) Patent No.: US 11,983,273 B2
(45) Date of Patent: May 14, 2024

(54) TRUSTED ORCHESTRATOR FUNCTION SUBSYSTEM INVENTORY AND VERIFICATION SYSTEM

(71) Applicant: Dell Products L.P., Round Rock, TX (US)

(72) Inventors: Srinivas Giri Raju Gowda, Santa Clara, CA (US); Syama Poluri, Round Rock, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 17/828,119

(22) Filed: May 31, 2022

(65) Prior Publication Data

US 2023/0385419 A1 Nov. 30, 2023

(51) Int. Cl.
*G06F 21/57* (2013.01)
*G06F 9/4401* (2018.01)
*G06F 13/10* (2006.01)
*G06F 21/00* (2013.01)
*G06F 21/44* (2013.01)
*G06F 21/50* (2013.01)

(52) U.S. Cl.
CPC ............ *G06F 21/572* (2013.01); *G06F 21/50* (2013.01); *G06F 9/4411* (2013.01); *G06F 13/10* (2013.01); *G06F 21/00* (2013.01); *G06F 21/44* (2013.01); *G06F 21/575* (2013.01); *G06F 2221/033* (2013.01)

(58) Field of Classification Search
CPC ...... G06F 21/572; G06F 21/575; G06F 21/44; G06F 21/00; G06F 9/4411; G06F 13/10; G06F 21/50; G06F 2221/033

USPC .................................................. 713/1, 2, 100
See application file for complete search history.

(56) References Cited

U.S. PATENT DOCUMENTS

| 9,208,112 | B1* | 12/2015 | Xie ......................... G06F 13/24 |
| 11,075,952 | B2 | 7/2021 | Ramachandran et al. |
| 2008/0209544 | A1* | 8/2008 | Kempka ............... G06F 21/445 |
| | | | 726/17 |
| 2009/0083849 | A1* | 3/2009 | Wong ...................... G06F 21/31 |
| | | | 726/18 |
| 2015/0363590 | A1* | 12/2015 | Patel ..................... H04L 63/102 |
| | | | 726/17 |

(Continued)

*Primary Examiner* — Ji H Bae
(74) *Attorney, Agent, or Firm* — Joseph Mencher

(57) ABSTRACT

A trusted orchestrator function subsystem inventory and verification system includes an OS, a BIOS, a management device, and a trusted orchestrator device. In response to presentation of a function subsystem to the OS during runtime, the OS generates a function subsystem detection alert that identifies the function subsystem. In response to the function subsystem detection alert, the BIOS generates and provides a BIOS inventory update that identifies the function subsystem. The management device receives the BIOS inventory update and, in response, forwards the BIOS inventory update. The trusted orchestrator device receives the BIOS inventory update and, in response, determine whether the function subsystem identified in the BIOS inventory update is included in a trusted function subsystem inventory. If so, the trusted orchestrator device allows the operating system to utilize the function subsystem while, if not, the trusted orchestrator device prevents the operating system from utilizing the function subsystem.

20 Claims, 23 Drawing Sheets

(56) References Cited

U.S. PATENT DOCUMENTS

| | | | |
|---|---|---|---|
| 2018/0300469 A1* | 10/2018 | Sarfraz | G06F 21/554 |
| 2019/0089706 A1* | 3/2019 | Rose | G06F 21/44 |
| 2022/0132604 A1* | 4/2022 | Hughes | H04W 48/16 |
| 2023/0394154 A1* | 12/2023 | Gowda | G06F 21/572 |

* cited by examiner

TRUSTED ORCHESTRATOR FUNCTION SUBSYSTEM INVENTORY AND VERIFICATION SYSTEM

BACKGROUND

The present disclosure relates generally to information handling systems, and more particularly to inventorying and verifying function subsystems presented to an information handling system by a trusted orchestrator.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, an LCS may be provided using a Bare Metal Server (BMS) system, with a processing system and memory system in the BMS system used to provide an Operating System (OS) for the LCS. One technique for providing such an LCS may include the use of a trusted orchestrator device in the BMS system that operates to compose the LCS and provide accessible physical function subsystems and virtual function subsystems ("function subsystems" below) to the OS in order to enable the performance of a variety of functions by the LCS. As will be appreciated by one of skill in the art in possession of the present disclosure, such trusted orchestrator devices may be "trusted" based on their having been manufactured by a BMS system manufacturer that provides the BMS system, their having been secure by the BMS system manufacturer, and/or due to any other trusted device factors that would be apparent to one of skill in the art in possession of the present disclosure. Furthermore, a management device is often also provided in the BMS system in order to manage the function subsystems that are provided to the OS. However, in such LCSs, it is desirable to have the trusted orchestrator device provide a "gatekeeping" functionality for the LCS (i.e., controlling which function subsystems are provided to the LCS), while having the management device perform the management functionality for the function subsystems provided to the LCS, which can raise some issues.

For example, the management device will typically rely on the trusted orchestrator device to provide an inventory of all of the function subsystems that it provides to the OS in order to allow for the management functionality discussed above. However, situations exist in which function subsystems may be connected to the BMS system (e.g., networking cards, storage devices, and/or other function subsystems that are physically connected to the BMS system, virtual functions that are instantiated on hardware connected to the BMS system, etc.) without knowledge of the trusted orchestrator device, which may result in an inability of the OS to access those function subsystems in some situations, while possibly presenting security issues in other situations in which those function subsystems are provided to the OS but are not authorized as per the inventory controlled by the trusted orchestrator device.

Accordingly, it would be desirable to provide a trusted orchestrator function subsystem inventory and verification system that addresses the issues discussed above.

SUMMARY

According to one embodiment, a Bare Metal Server (BMS) system includes a Bare Metal Server (BMS) chassis; a processing system that is included in the BMS chassis; a memory system that is included in the BMS chassis, that is coupled to the processing system, and that includes instructions that, when executed by the processing system, cause the processing system to provide an operating system that is configured as part of a Logically Composed System (LCS) and that, in response to presentation of a function subsystem to the operating system during runtime, generates a function subsystem detection alert that identifies the function subsystem; a Basic Input/Output System (BIOS) that is included in the BMS chassis, that is coupled to the processing system, and that is configured, in response to the function subsystem detection alert, to generate and provide a BIOS inventory update that identifies the function subsystem; a management device that is included in the BMS chassis, that is coupled to the BIOS, and that is configured to receive the BIOS inventory update and, in response, forward the BIOS inventory update; and a trusted orchestrator device that is included in the BMS chassis, that is coupled to the management device, and that is configured to receive the BIOS inventory update and, in response, determine whether the function subsystem identified in the BIOS inventory update is included in a trusted function subsystem inventory, and: in response to the function subsystem being included in the trusted function subsystem inventory, allow the operating system to utilize the function subsystem; and in response to the function subsystem not being included in the trusted function subsystem inventory, prevent the operating system from utilizing the function subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
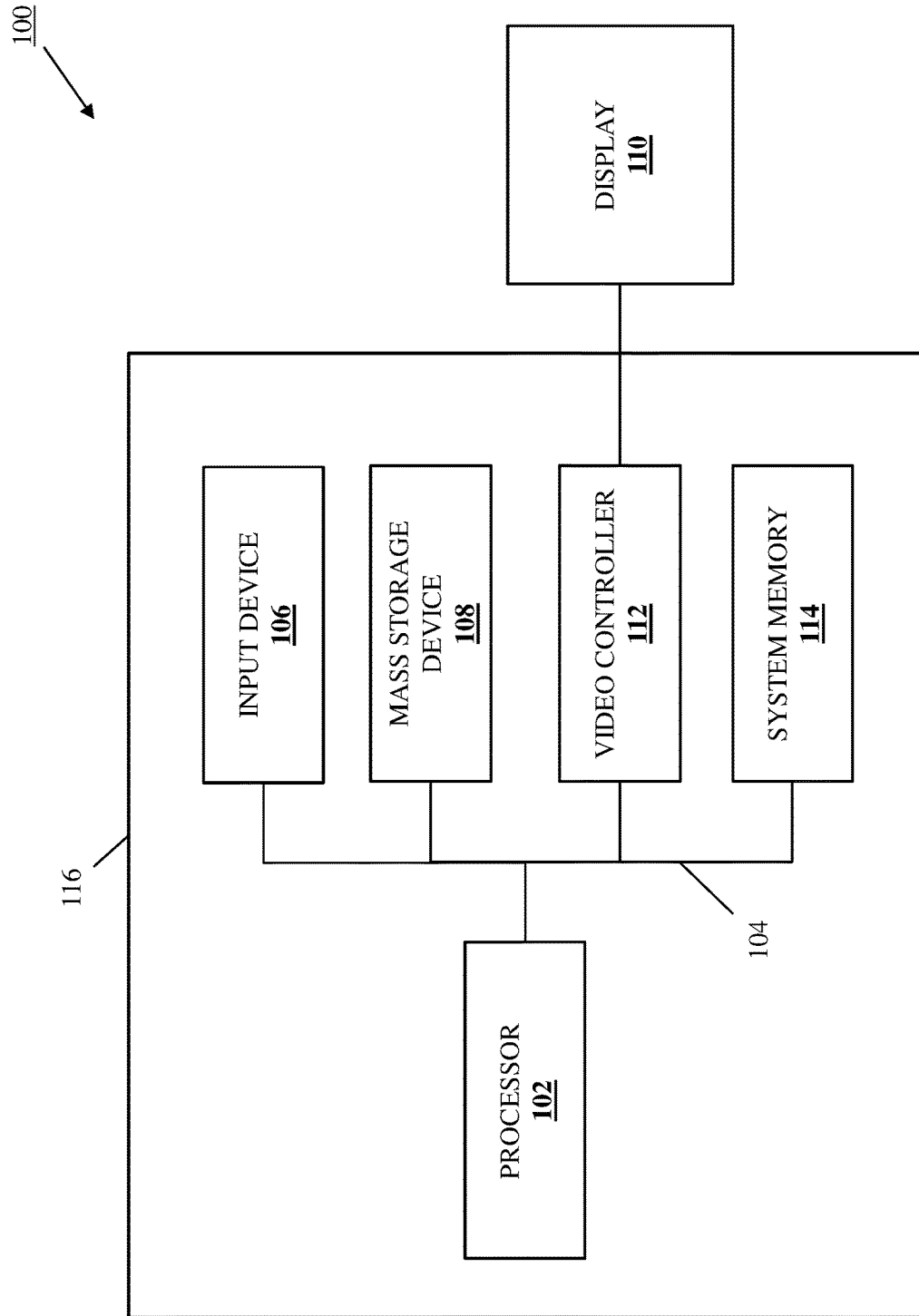
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the trusted orchestrator function subsystem inventory and verification systems and methods of the present disclosure may be utilized to provide Logically Composed Systems (LCSs), and one of skill in the art in possession of the present disclosure will recognize that such LCSs may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
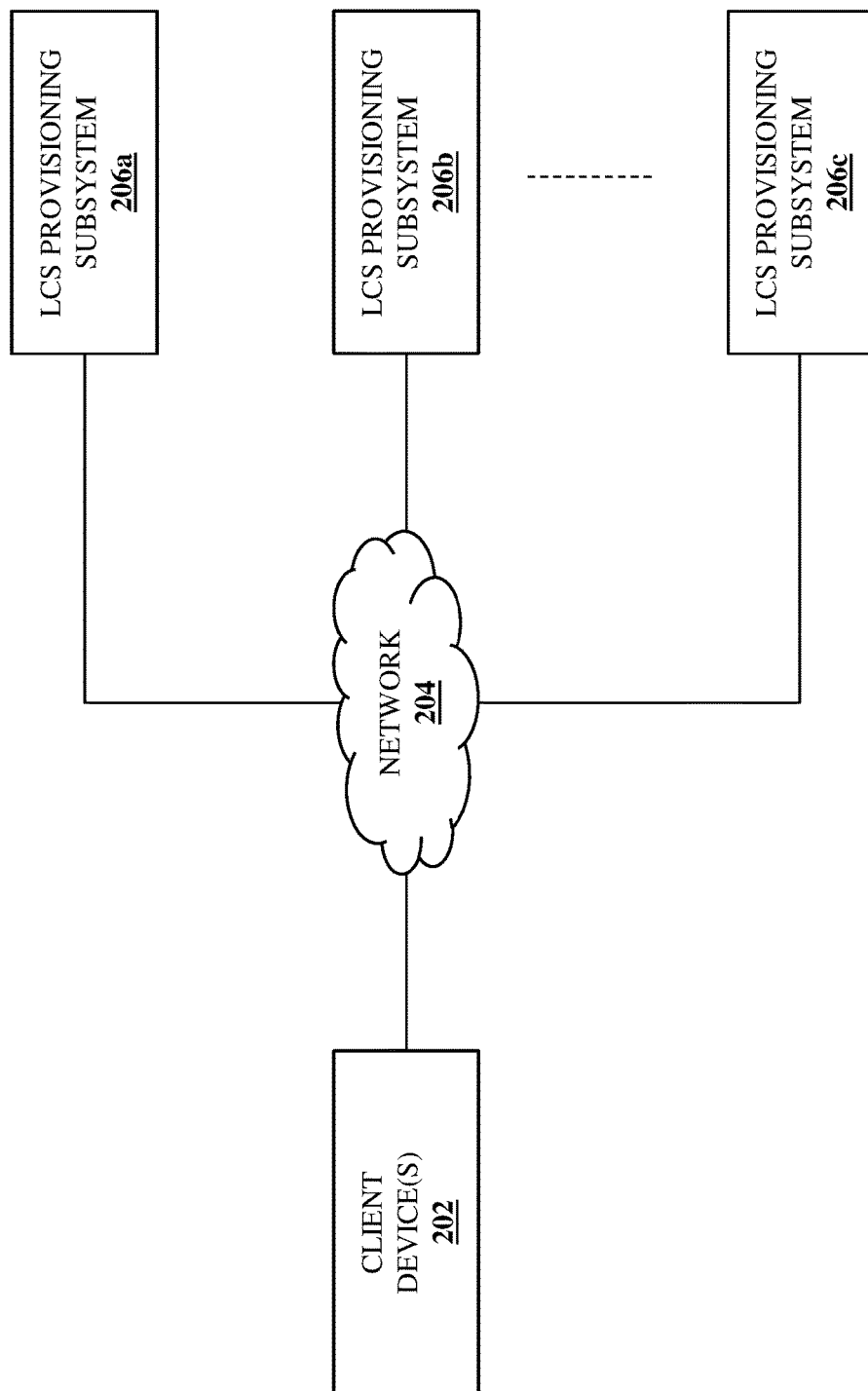
FIG. 2 is a schematic view illustrating an embodiment of an LCS provisioning system.

With reference to FIG. 2, an embodiment of a Logically Composed System (LCS) provisioning system 200 is illustrated that may be utilized with the trusted orchestrator function subsystem inventory and verification systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
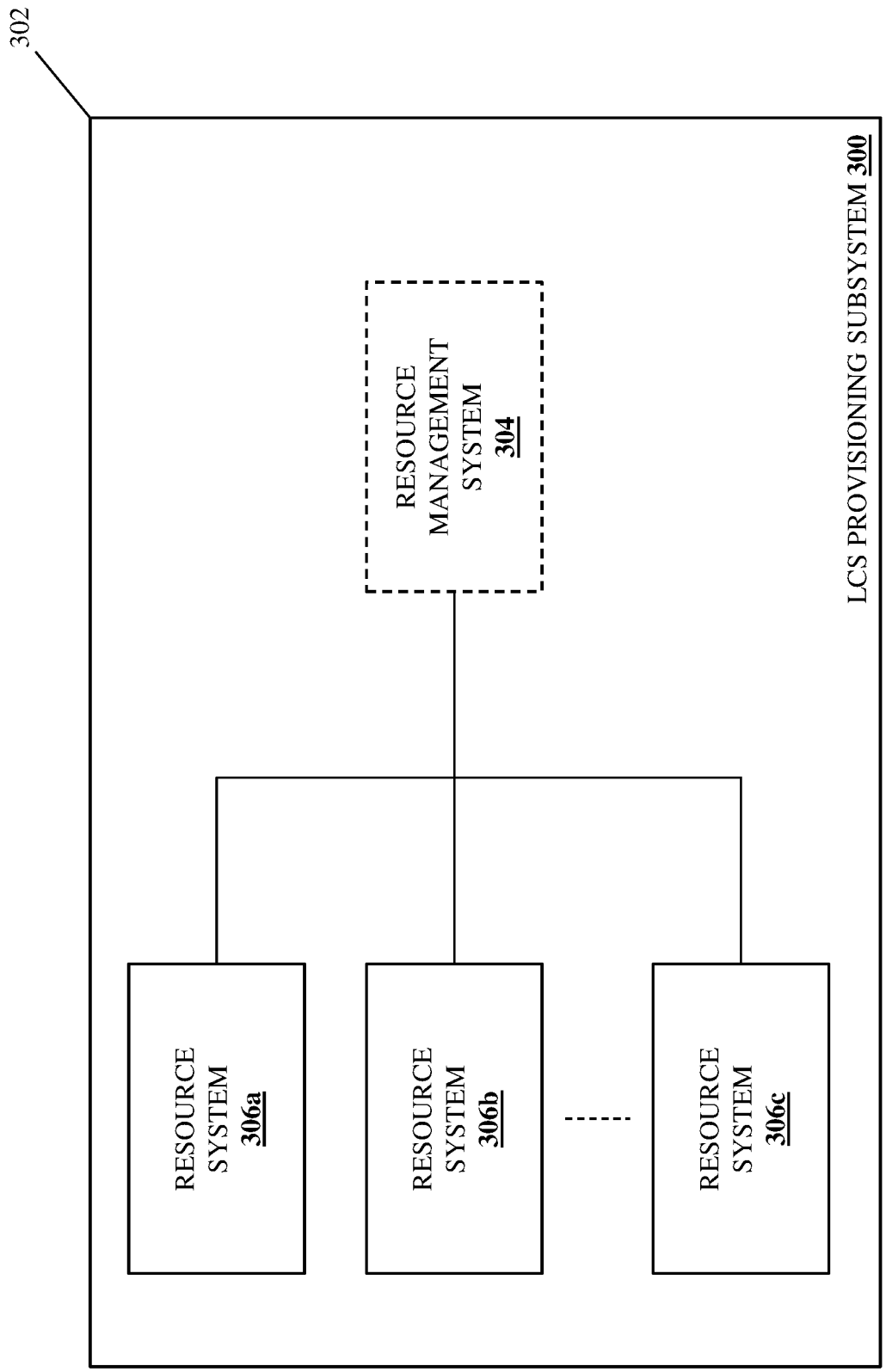
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource management systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306a-306c may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306a-306c, and that performs the functionality of the resource management system 304 described below. In some examples, the resource management system 304 may be provided by a "stand-alone" system (e.g., that is provided in a chassis that is separate from the respective chassis utilized for each of the resource systems 306a-306c) and the SCPM subsystem discussed below, may be provided by a dedicated SCP device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem may be provided by an SCP device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices in the resource systems 306a-306c and the resource management system 304 (when provided as a stand-alone system) may operate to "elect" or otherwise select one or more of those SCP devices to operate as the SCPM subsystem described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
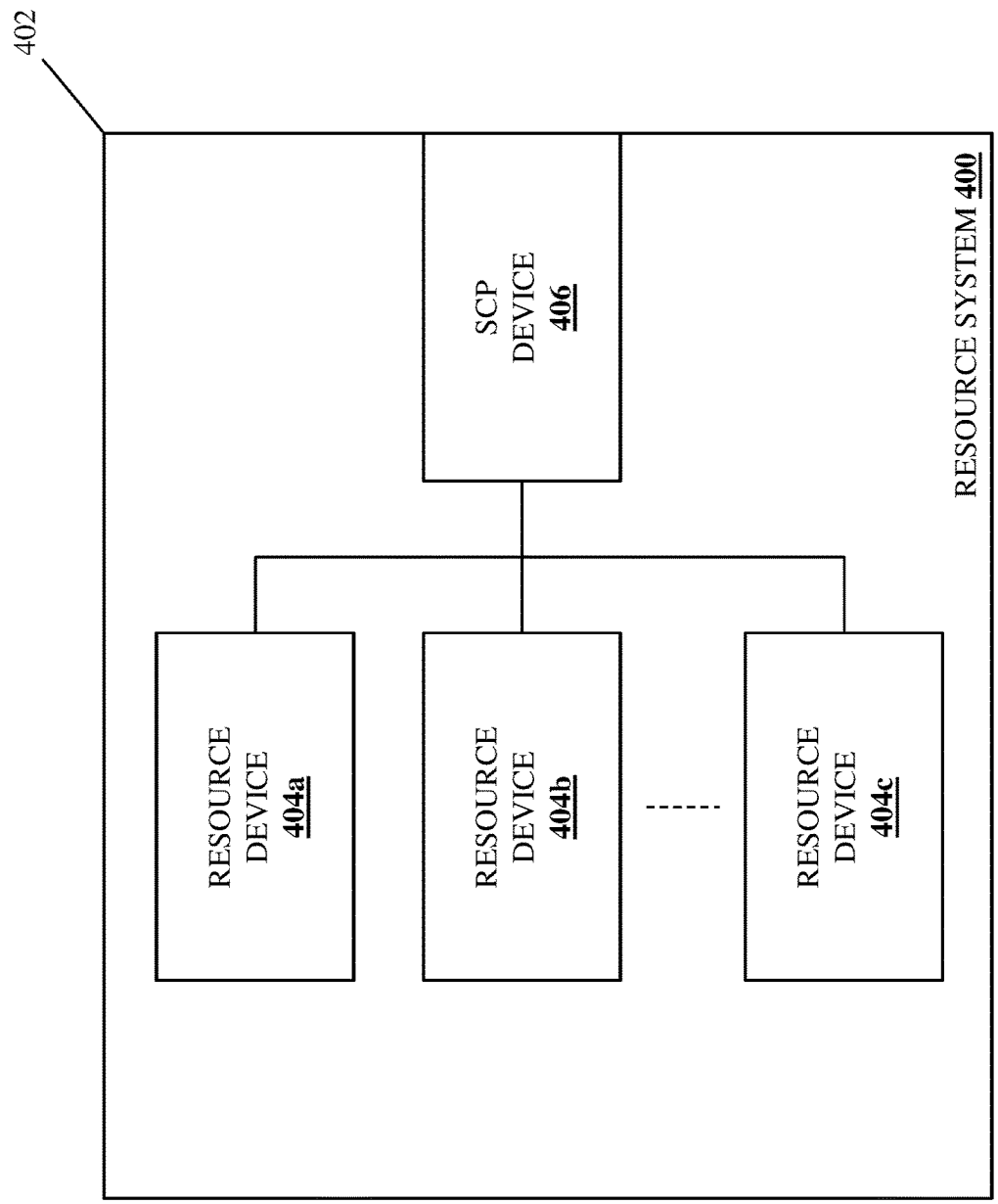
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may operate to provide a trusted orchestrator device that provides a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on other devices while remaining within the scope of the present disclosure as well.

Thus, the resource source system 400 may include the chassis 402 including the SCP device 406 connected to any combinations of resource devices. To provide a specific embodiment, the resource system 400 may provide a "Bare Metal Server (BMS)" system that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
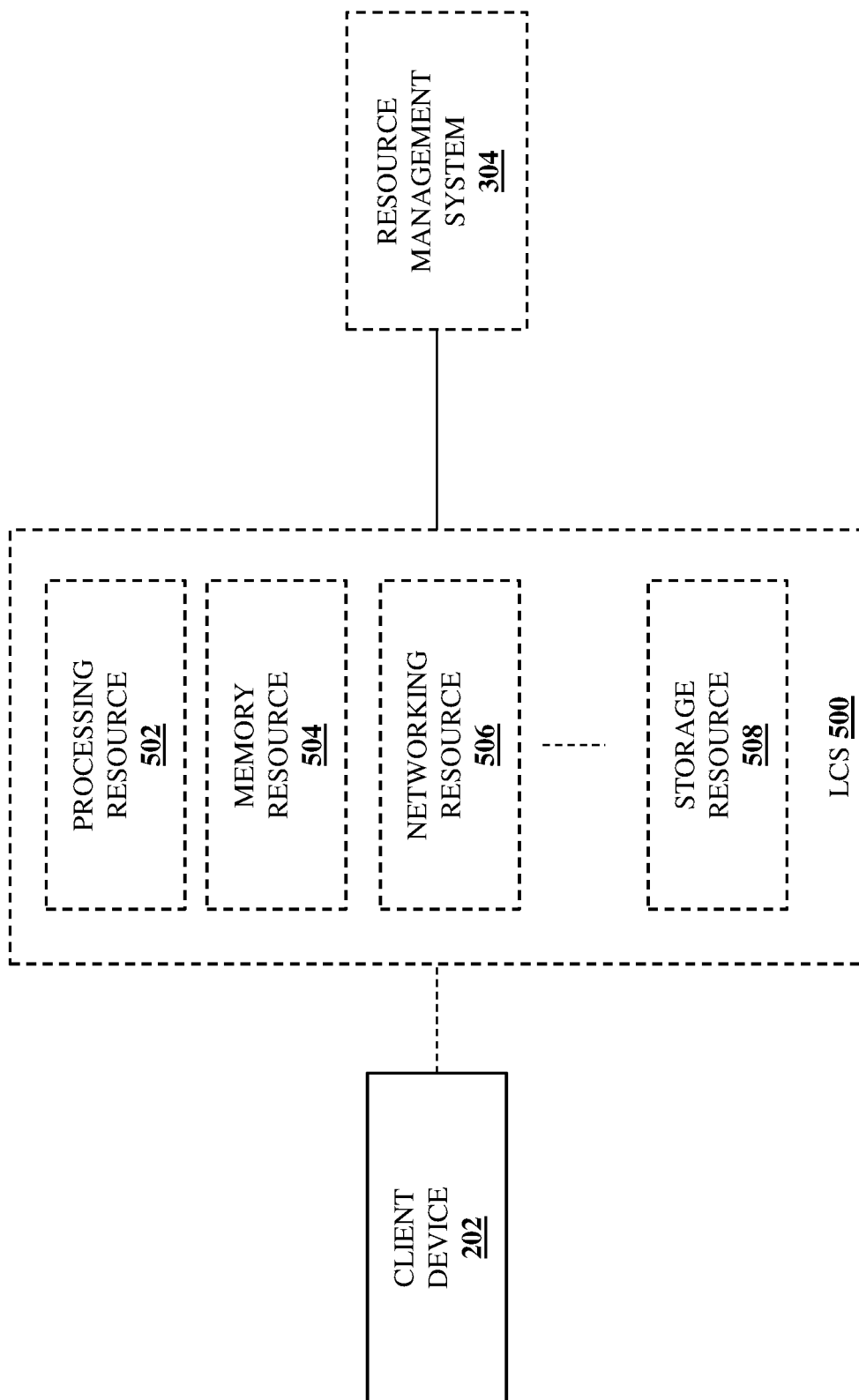
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
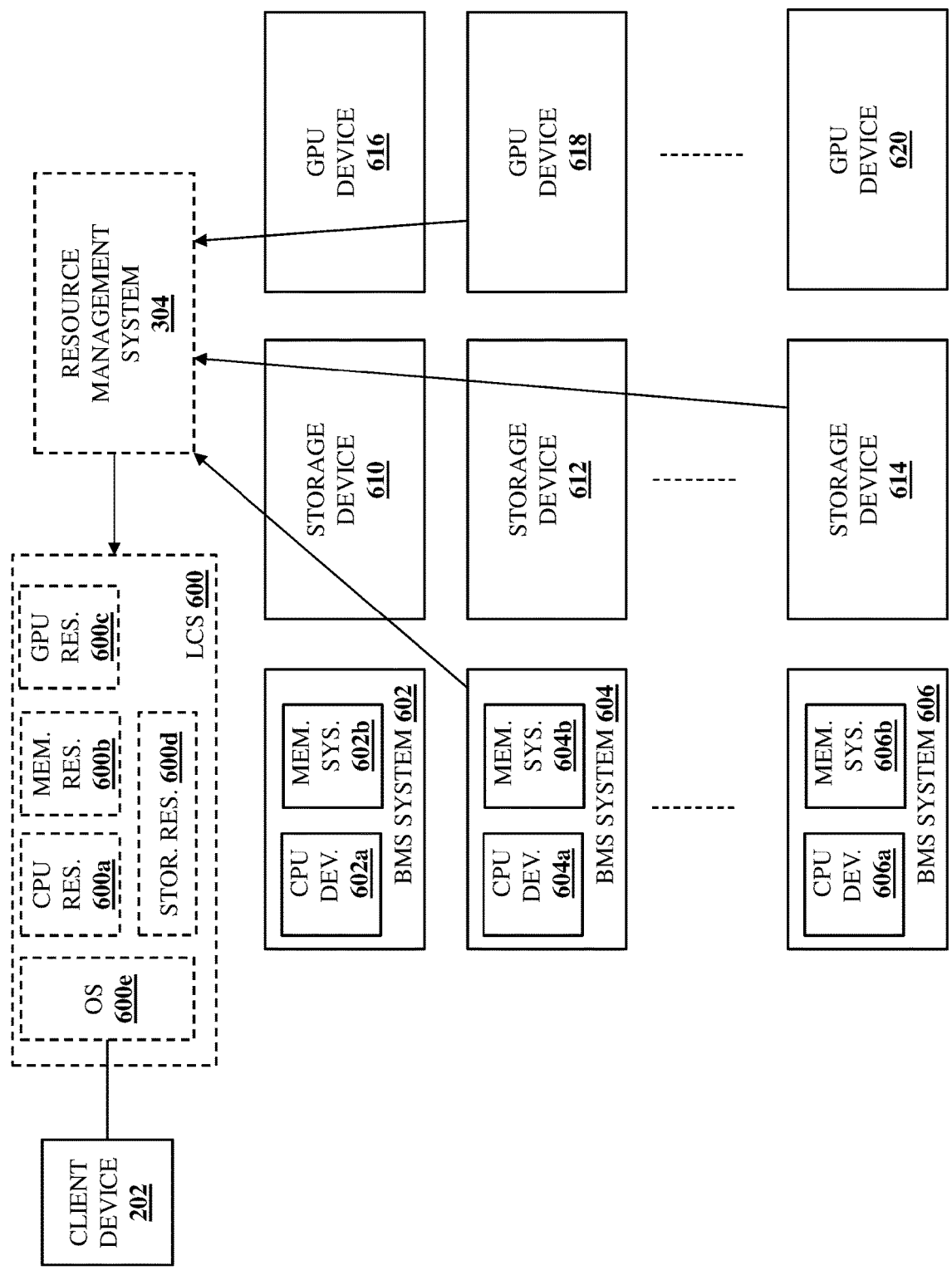
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) system and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) system 602 having a Central Processing Unit (CPU) device 602a and a memory system 602b, a BMS system 604 having a CPU device 604a and a memory system 604b, and up to a BMS system 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS system 604 to provide the LCS 600 with CPU resources 600a that utilize the CPU device 604a in the BMS system 604, and memory resources 600b that utilize the memory system 604b in the BMS system 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS system 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS system 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS system 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
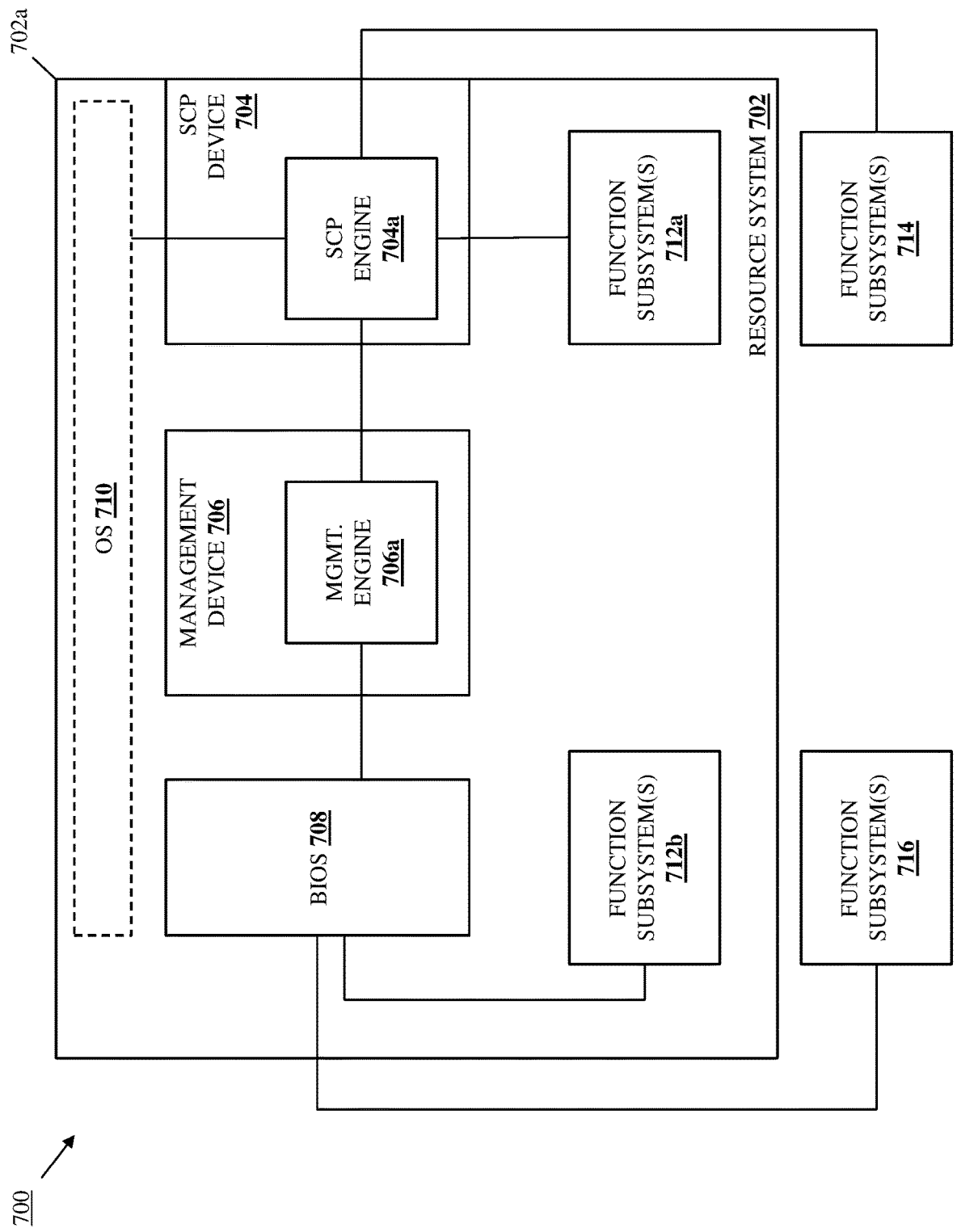
FIG. 7 is a schematic view illustrating an embodiment of the resource system of FIG. 4.

Referring now to FIG. 7, an embodiment of a trusted orchestrator function subsystem inventory and verification system 700 is illustrated that may operate according to the teachings of the present disclosure. In the illustrated embodiment, the trusted orchestrator function subsystem inventory and verification system 700 includes a resource system 702 that may provide any of the resource systems 306a-306c and 400 discussed above, and in the specific examples below is described as providing a BMS system that may be any of the BMS systems 602-606 discussed above with reference to FIG. 6. However, while described as being provide by particular resource systems/BMS systems, one of skill in the art in possession of the present disclosure will appreciate how the teachings of the present disclosure may be utilized in other computing devices/systems/scenarios while remaining within the scope of the present disclosure as well.

In the illustrated embodiment, the resource system 702 includes a chassis 702a that houses the components of the resource system 702, only some of which are illustrated and discussed below. For example, the chassis 702a may house a trusted orchestrator device that, in the examples provided herein is provided by an SCP device 704 that may be provided by any of the SCP devices discussed above, and that is configured to orchestrate the provisioning of function subsystems to an operating system that is included in an LCS provided, at least in part, using the resource system 702, discussed in further detail below. As will be appreciated by one of skill in the art in possession of the present disclosure, the SCP device 704 may be "trusted" due to it having been manufactured by a manufacturer of the resource system 702/BMS system, due to it having been secured by the manufacturer of the resource system 702/BMS system, and/or based on other "trust" factors that would be apparent to one of skill in the art in possession of the present disclosure.

As discussed above, the SCP device 704 may be "trusted" because it provides a root-of-trust for its corresponding resource devices/systems, and thus may be configured with restricted access to its hardware and/or software that has been validated and is maintained within a closed-loop infrastructure. For example, the SCP device 704 may run cryptographically signed software validated via the root-of-trust, with connectivity to both a BMS BMC and the SCPM device discussed above, and with all communications internal to the closed-loop infrastructure secured to ensure their veracity. To contrast, an "untrusted" device (e.g., a Data Processing Unit (DPU) device) may include similar hardware/software/capabilities as the SCP device 704, but a user of the SCP device 704 may not be able to access such hardware/software/capabilities on the SCP device 704 unless it is part of/connected to an authorized network. However, while illustrated and described below as being provided by an SCP device, one of skill in the art in possession of the present disclosure will appreciate how other trusted orchestrator devices having similar functionality to the SCP device 704 discussed below will fall within the scope of the present disclosure as well.

In the illustrated embodiment, the SCP device 704 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine 704a that is configured to perform the functionality of the SCP engines and/or SCP devices discussed below. Furthermore, while not illustrated in the examples or discussed in detail below, as discussed above, the SCP device 704 may include a variety of hardware and/or software that is configured to allow the SCP engine 704a/SCP device 704 to perform any of a variety of SCP-enhanced functionality for any LCS that is provided using the resource system 702.

The chassis 702a may also house a management device 706 that is coupled to the SCP engine 704 and configured to manage function subsystems provided to an operating system that is part of an LCS provided, at least in part, using the resource system 702, discussed in further detail above. For example, the management device 706 may be provided by a remote access controller device such as, for example, the integrated DELL® Remote Access Controller (iDRAC) device available from DELL® Inc. of Round Rock, Texas, United States; a Baseboard Management Controller (BMC) device, a Platform Service Processor (PSP) device, and/or any other management devices that one of skill in the art in possession of the present disclosure would recognize as being capable of providing the functionality described below. However, while illustrated and described below as being provided by particular management devices, one of skill in the art in possession of the present disclosure will appreciate how other devices having similar functionality to the management device 706 discussed below will fall within the scope of the present disclosure as well.

In the illustrated embodiment, the management device 706 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a management engine 706a that is configured to perform the functionality of the management engines and/or management devices discussed below. As illustrated, the management engine 706a may be coupled to the SCP engine 704a via, for example, a coupling between their corresponding processing systems, which may be provided by a management communication coupling, a "side-band" communication coupling, and/or other communications couplings that would be apparent to one of skill in the art in possession of the present disclosure.

The chassis 702a may also house a Basic Input/Output System (BIOS) 708 that is coupled to the management device 706 and that one of skill in the art in possession of the present disclosure will recognize may be provided by firmware that is configured to perform initialization operations (e.g., hardware initialization operations) for the resource system 702 during "boot", "power-on start-up", or other initialization of the resource system 702, runtime services for operating systems and/or other applications provided using the resource system 702, as well as any other BIOS operations that would be apparent to one of skill in the art in possession of the present disclosure. As illustrated, the BIOS 708 may be coupled to the management engine 706a (e.g., BIOS firmware may be coupled to the processing system that provides the management engine 706a) via any of a variety of communication couplings that would be apparent to one of skill in the art in possession of the present disclosure. Furthermore, while a "BIOS" is illustrated and described herein, one of skill in the art in possession of the present disclosure will appreciate how the BIOS 708 may be provided by a Unified Extensible Firmware Interface (UEFI) that is provided according to the UEFI specification that defines a software interface between an operating system provided by the resource system 702 and platform firmware included in the resource system 702, and which was introduced to replace the legacy BIOS while providing support for legacy BIOS services, while also enabling remote/network accessible diagnostics without the need for an operating system, as well as any other UEFI functionality that would be apparent to one of skill in the art in possession of the present disclosure.

As discussed above, the resource system 702 may include a processing system (not illustrated, but which may include the processor 102 discussed above with reference to FIG. 1 such as, for example, a Central Processing Unit (CPU)) and a memory system (not illustrated, but which may include the memory 114 discussed above with reference to FIG. 1) that is coupled to the processing system and that includes instructions that, when executed by the processing system, cause the processing system to provide an operating system 710 that is configured to perform the functionality of the operating systems discussed below. Continuing with the example in which the resource system 702 is a BMS system, the operating system 710 may be provided similarly as the operating system 600e provided for the LCS 600 via the BMS system 604 in FIG. 6 discussed above. Furthermore, one of skill in the art in possession of the present disclosure will appreciate how the operating system 710 may be provided by an operating system similar to those provided on desktop computing devices, laptop/notebook computing devices, tablet computing devices, and mobile phones; by a "hypervisor" operating system that is configured to create and provide virtual machines; and/or by any other operating systems that would be apparent to one of skill in the art in possession of the present disclosure. As such, the resource system 702 may be utilized to provide an LCS via the operating system 710 provided using its processing system and memory system (also called a "host" operating system), as well as other functionality subsystems that may be provided to the operating system 710.

For example, FIG. 7 illustrates how function subsystems 712a and 712b may be included in the chassis 702, with the function subsystem(s) 712a accessible to the SCP device 704 (e.g., via a coupling between the SCP engine 704a and the function subsystem(s) 712a), and the function subsystem(s) 712b not accessible to the SCP device 704 (e.g., due to the lack of a coupling between the SCP engine 704a and the function subsystem(s) 712b). Furthermore, FIG. 7 also illustrates how function subsystems 714 and 716 may be provided outside the chassis 702, with the function subsystem(s) 714 accessible to the SCP device 704 (e.g., via a coupling between the SCP engine 704a and the function subsystem(s) 714), and the function subsystem(s) 716 not accessible to the SCP device 704 (e.g., due to the lack of a coupling between the SCP engine 704a and the function subsystem(s) 716). As discussed below, the function subsystems 712b and 716 may be accessible to the BIOS 708 in a manner that allows the BIOS 708 to identify the presence of the function subsystem(s) 712b and 716, and one of skill in the art in possession of the present disclosure will appreciate how that accessibility may be provided in any manner that allows the BIOS 708 to identify the presentation of those functional subsystem(s) 712b and 716 to the operating system 710 as discussed in further detail below.

As discussed above, the function subsystems 712a, 712b, 714, and 716 may be provided by any physical function subsystems or virtual function subsystems that one of skill in the art in possession of the present disclosure would recognize as capable of being utilized by the operating system 710 to provide the LCSs discussed above. As such, the function subsystems 712a, 712b, 714, and 716 may include processing systems, memory systems, storage systems, networking systems, and/or other physical function subsystems that would be apparent to one of skill in the art in possession of the present disclosure, as well as virtual function subsystems that may be instantiated on any of those physical subsystems.

As discussed above, when providing an LCS, it is desirable to have the trusted orchestrator device (which is provided by the SCP device 704 in the examples herein) perform a "gatekeeping" functionality for the LCS by controlling which function subsystems are provided to the LCS, while having the management device 706 perform the management functionality for the function subsystems provided to the LCS. However, the management device 706 will typically rely on the SCP device 704 to provide an inventory of all of the function subsystems that are provided to the operating system 710 in order to allow for the management functionality discussed above, and FIG. 7 illustrates a situation in which function subsystems 712b and 716 are connected to the resource system 702 without knowledge of the SCP device 704, which conventionally may result in an inability of the operating system 710 to access those function subsystems 712b and 716 in some situations, while possibly presenting security issues in other situations in which those function subsystems 712b and 716 are provided to the operating system but are not authorized as per the inventory controlled by the SCP device 704. However, while a specific trusted orchestrator function subsystem inventory and verification system 700 has been illustrated and described, one of skill in the art in possession of the present disclosure will recognize that the trusted orchestrator function subsystem inventory and verification system of the present disclosure may include a variety of components and/or component configurations for providing conventional functionality, as well as the functionality discussed below, while remaining within the scope of the present disclosure as well.

Figure 8:
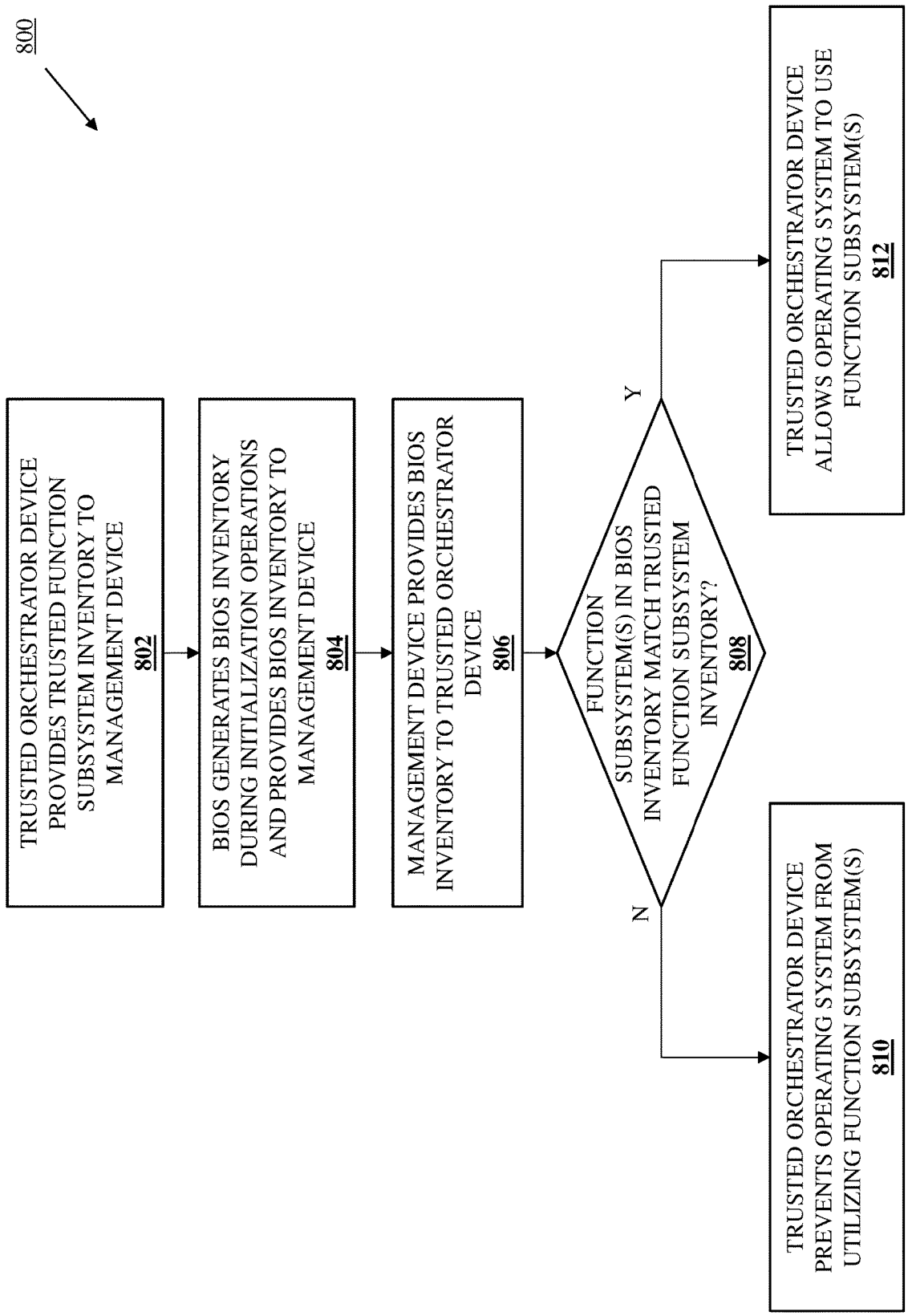
FIG. 8 is a flow chart illustrating an embodiment of a method for inventorying and verifying function subsystems presented to an operating system during initialization operations.

Referring now to FIG. 8, an embodiment of a method 800 for inventorying and verifying function subsystems presented to an operating system during initialization operations is illustrated. As discussed below, the systems and methods of the present disclosure provide for the inventorying and verification of function subsystems presented to an operating system for an LCS during initialization operations and outside the knowledge of a trusted orchestrator device that is intended to "gatekeep" the provisioning of function subsystems to the LCS. For example, the trusted orchestrator function subsystem inventory and verification system of the present disclosure may include an operating system ("OS"), a BIOS, a management device, and a trusted orchestrator device. During initialization operations, the BIOS generates and provides a BIOS inventory that identifies a function subsystem that is configured for presentation to the OS. The management device receives the BIOS inventory and, in response, forwards the BIOS inventory. The trusted orchestrator device receives the BIOS inventory and, in response, determines whether the function subsystem identified in the BIOS inventory update is included in a trusted function subsystem inventory. If so, the trusted orchestrator device allows the operating system to utilize the function subsystem while, if not, the trusted orchestrator device prevents the operating system from utilizing the function subsystem. As such, function subsystems presented to an operating system for an LCS during runtime and outside the knowledge of the trusted orchestrator device may be inventoried and verified by the trusted orchestrator device before being provided to that operating system.

Figure 9:
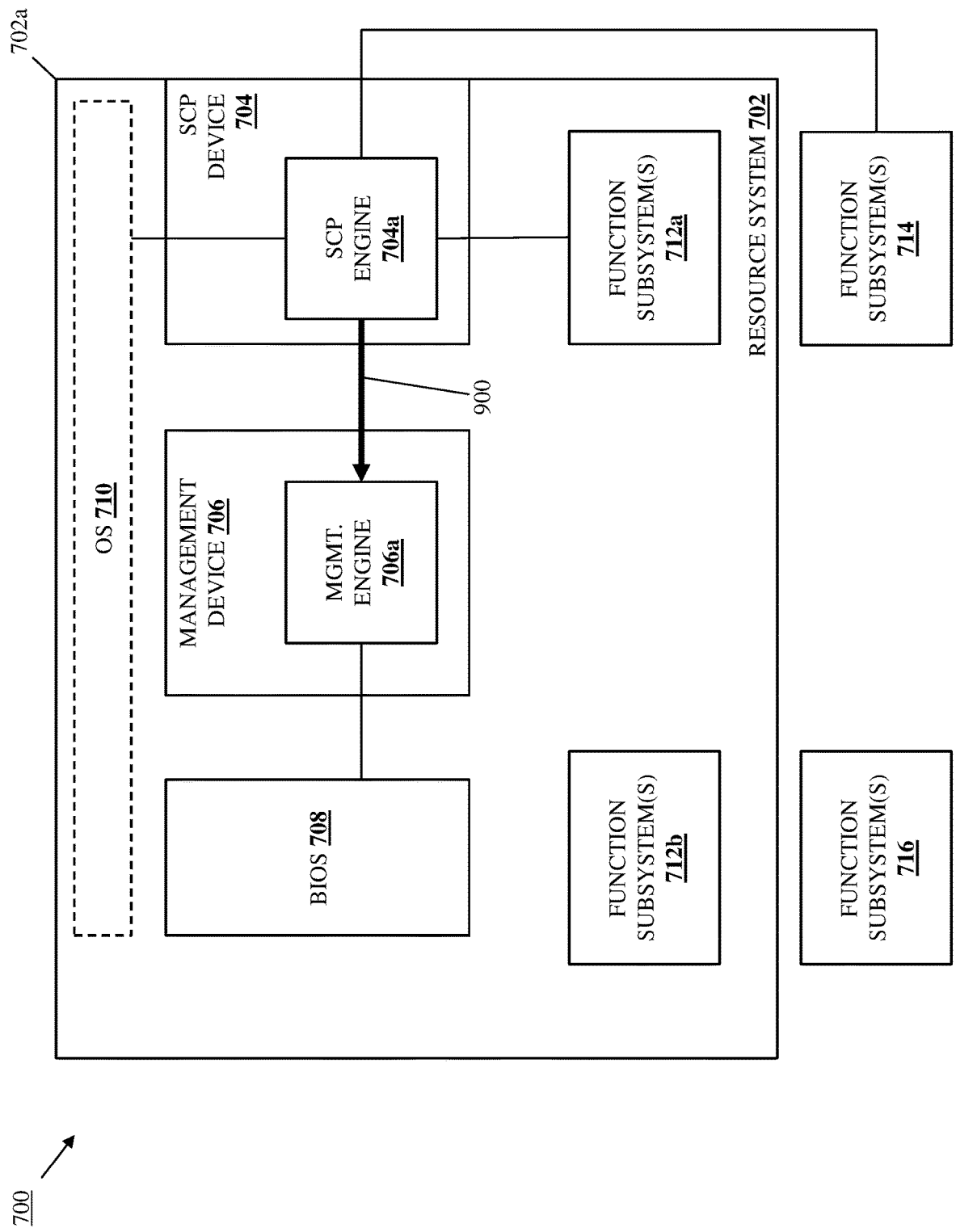
FIG. 9 is a schematic view illustrating an embodiment of the resource system of FIG. 7 operating during the method of FIG. 8.

The method 800 begins at block 802 where a trusted orchestrator device provides a trusted function subsystem inventory to a management device. With reference to FIG. 9, in an embodiment of block 802, the SCP engine 704a in the SCP device 704 of the resource system 702 (e.g., a BMS system) may perform trusted function subsystem inventory provisioning operations 900 that may include providing a trusted function subsystem inventory to the management engine 706a in the management device 706, and while not illustrated or discussed in detail herein, one of skill in the art in possession of the present disclosure will recognize how the management engine 706a may store the trusted function subsystem inventory in a database provided in a storage system that is included in the management device 706 and/or otherwise accessible to the management engine 706a. In a specific example, the trusted function subsystem inventory may be provided to the management device 706 via the management communication coupling, side-band communication coupling, and/or other communication couplings discussed above. As discussed below, the trusted function subsystem inventory may identify function subsystems in a "device presentation layer" that the SCP device 704 is configured to provide to the operating system 710, or changes in such a device presentation layer (e.g., changes from one or more trusted function subsystem inventories that were previously provided to the management device 706).

For example, the trusted function subsystem inventory may identify function subsystems that may be provided to operating system(s) provided using the resource system 702, and thus may identify physical function subsystems (e.g., any of the resource devices 404a-404c discussed above with reference to FIG. 4) or virtual function subsystems that may be provided using physical function subsystems, either of which may be included within or located outside of the chassis 702a of the resource system 702. As discussed above, the SCP device 704 may be configured, as part of initialization operations for the resource system 700, to present function subsystems that will be provided to the operating system 710 during runtime via PCIe interfaces and/or other interfaces that would be apparent to one of skill in the art in possession of the present disclosure. As discussed above, the SCP device 704 may be configured to operate as a "gatekeeper" with regard to the provisioning of function subsystems to operating system(s) provided using the resource system 702, and thus a network administrator or other user may define which function subsystems should be provided to such operating system(s) by defining those function subsystems in the trusted function subsystem inventory. However, while a specific trusted function subsystem inventory is described, one of skill in the art in possession of the present disclosure will appreciate how trusted function subsystem inventories may be provided in other manners that will fall within the scope of the present disclosure as well.

For example, a trusted function subsystem inventory may define all the function subsystems that may be provided to any operating system provided using the resource system 702, and thus any operating system providing any LCS may be restricted to utilizing the function subsystems defined in the trusted function subsystem inventory. However, in other examples, any trusted function subsystem inventory may define all the function subsystems that may be provided to a particular operating system that is provided using the resource system 702 in order to provide a particular LCS, and thus any particular operating system providing any particular LCS will be restricted to utilizing the function subsystems defined in the trusted function subsystem inventory for that operating system/LCS. As such, one of skill in the art in possession of the present disclosure will appreciate how the trusted function subsystem inventory may be implemented in the systems and methods of the present disclosure in a variety of manners that will fall within its scope as well.

One of skill in the art in possession of the present disclosure will also appreciate that the trusted function subsystem inventory may be provided to the management device 706 at different times. For example, the method 800 describes the inventorying and verification of function subsystems that are presented to an operating system during initialization operations for the resource system 702, and thus the trusted function subsystem inventory may be provided to the management device 706 prior to those initialization operations (e.g., during a runtime environment for the resource system 702 that occurs prior to those initialization operations), as part of those initialization operations (e.g., following a power-on, reset, and/or other initialization of the resource system 702 and prior to runtime), and/or at any other time that would be apparent to one of skill in the art in possession of the present disclosure. As such, one of skill in the art in possession of the present disclosure will appreciate how the management device 706 may rely on the SCP device 704 to inventory all of the resources that are provisioned to an LCS, and at block 804 such an inventory may be provided.

Figure 10:
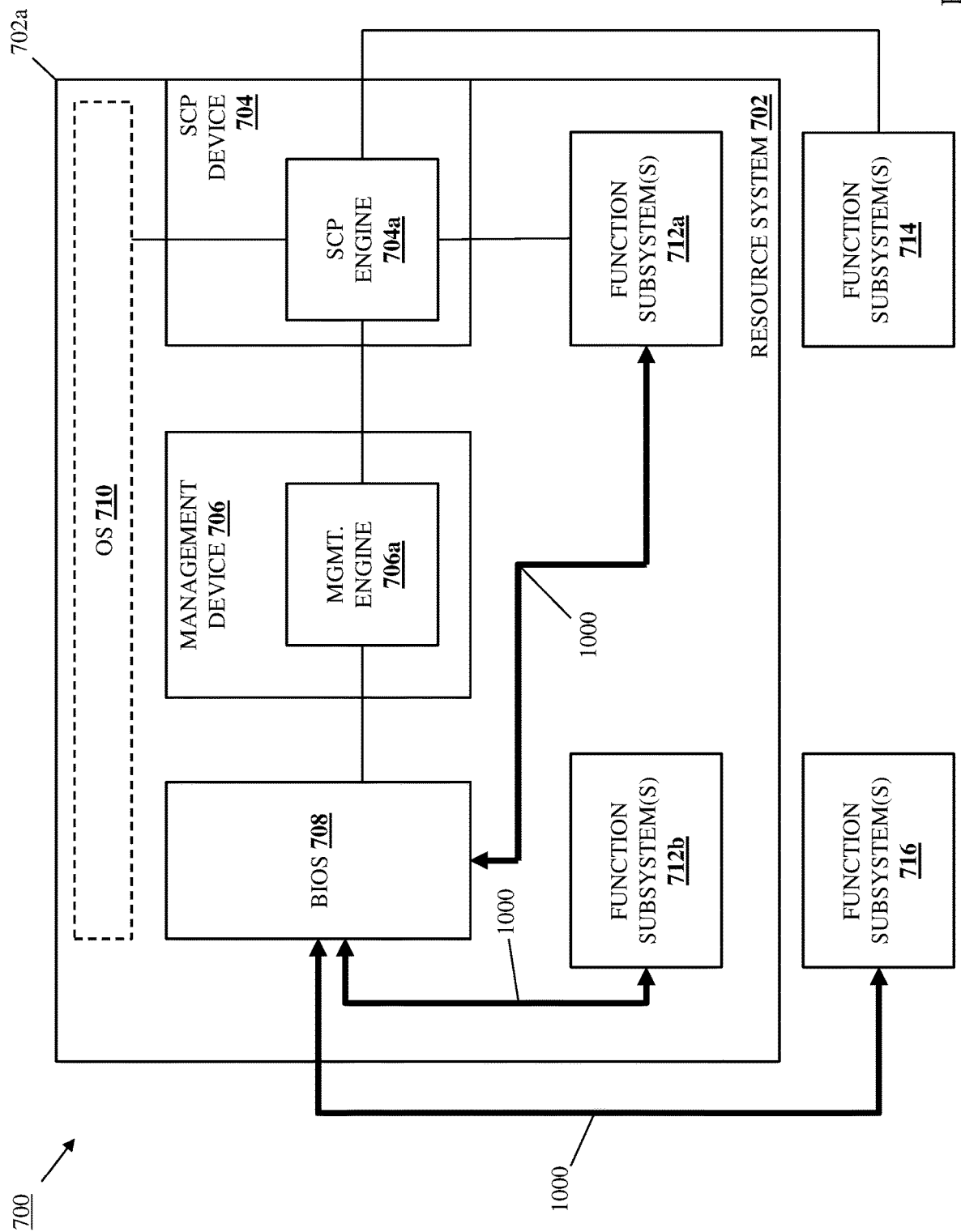
FIG. 10 is a schematic view illustrating an embodiment of the resource system of FIG. 7 operating during the method of FIG. 8.

The method 800 then proceeds to block 804 where a BIOS generates a BIOS inventory during initialization operations and provides the BIOS inventory to the management device. With reference to FIG. 10, in an embodiment of block 804, the BIOS 708 may perform BIOS inventory generation operations 1000 that may include identifying any of the function subsystems that are accessible to the BIOS 708 and, in response, generating a BIOS inventory that identifies those function subsystems. In the embodiment illustrated in FIG. 10, the BIOS 708 is illustrated as identifying each of the function subsystems 712a and 712b that are included in the chassis 702a (e.g., that are coupled to a motherboard or other circuit board in the chassis 702a) and the function subsystem(s) 716 that are located outside of the chassis 702a (e.g., that are coupled to a connector that is accessible on the chassis 702a, accessible via a network, etc.). However, while the BIOS 708 is illustrated as having access to all of the function subsystem(s) 712a in the chassis 702a that are also accessible to the SCP device 704, one of skill in the art in possession of the present disclosure will appreciate how the BIOS 708 is not configured to distinguish between function subsystems that are authorized for use with any particular LCS (e.g., via an LCS intent manifest), and function subsystems that are being provided by a non-trusted device (e.g., a non-SCP device). As such, while the BIOS 708 is capable of discovering function subsystems provided by non-trusted devices, the BIOS 708 relies on the trusted SCP device 704 to ensure those function subsystems are authorized for use with an LCS.

In a specific example, at block 804 the resource system 702 may be powered-on, reset, and/or otherwise initialized and, in response, the BIOS 708 may perform the BIOS inventory generation operations 1000 that include performing scanning operations (e.g., PCIe device scanning operations) that are configured to identify any physical devices (e.g., PCIe devices), or virtual functions provided by physical devices, that are configured for presentation to the operating system 710 once it is provided subsequent to the initialization operations. As will be appreciated by one of skill in the art in possession of the present disclosure, a function subsystem may be configured for presentation to an operating system if that function subsystem is coupled to the processing system and/or memory system that provide that operating system in any manner that would, absent the systems and methods described herein, allow that operating system to utilize that function subsystem during runtime of the resource system 702. In an embodiment, the scanning operations discussed above may detect any PCIe device that is configured for presentation to the LCS (e.g., via ports connected to the SCP device 704, via ports connected to non-SCP devices, etc.). However, while a specific example of a PCIe device scanning operation has been described that identifies PCIe devices and/or functions provided by PCIe devices, one of skill in the art in possession of the present disclosure will appreciate how different function subsystems may be identified at block 804 while remaining within the scope of the present disclosure as well.

As such, at block 804 the BIOS 708 may generate the BIOS inventory that identifies each of the function subsystems that are accessible to the BIOS 708 and that are configured to be presented to the operating system 710 following the initialization operations, and one of skill in the art in possession of the present disclosure will appreciate how the BIOS inventory may identify those function subsystems using any of a variety of techniques known in the art. As discussed below, some embodiments of block 804 may result in the generation of a BIOS inventory that identifies only function subsystems that are also accessible to the SCP device 704, while other embodiments of block 804 may result in the generation of a BIOS inventory that identifies at least some function subsystems that are not accessible to the SCP device 704. To provide a specific example, function subsystems that are not accessible to the SCP device 704 may include networking cards, storage devices, and/or other PCIe devices that are physically connected to connectors on the resource system 702 that are not accessible to the SCP device 704, although one of skill in the art in possession of the present disclosure will appreciate how function subsystems may be inaccessible to the SCP device 704 based on other factors that will fall within the scope of the present disclosure as well.

Figure 11:
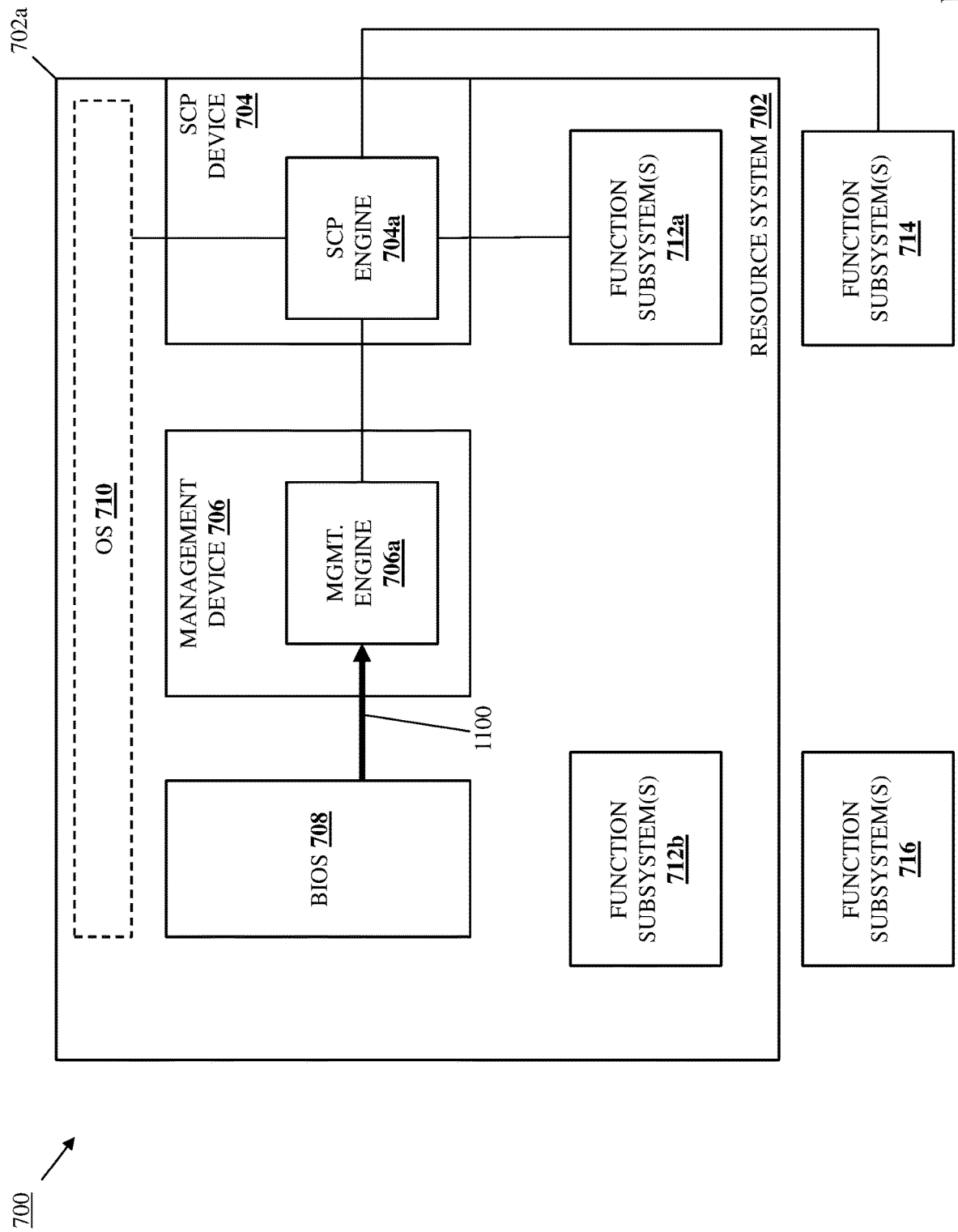
FIG. 11 is a schematic view illustrating an embodiment of the resource system of FIG. 7 operating during the method of FIG. 8.

With reference to FIG. 11, in an embodiment of block 804, the BIOS 708 may perform BIOS inventory provisioning operations 1100 that may include providing the BIOS inventory generated at block 804 to the management engine 706a in the management device 706, and while not illustrated or discussed in detail herein, one of skill in the art in possession of the present disclosure will recognize how the management engine 706a may store the BIOS inventory in a database provided in a storage system that is included in the management device 706 and/or otherwise accessible to the management engine 706a. In many embodiments, the provisioning of the BIOS inventory to the management device 706 may be performed during the initialization operations for the resource system 702, although some embodiments may include the provisioning of the BIOS inventory to the management device 706 during runtime for the resource system 702 and prior or subsequent to the initialization operations discussed herein.

Figure 12:
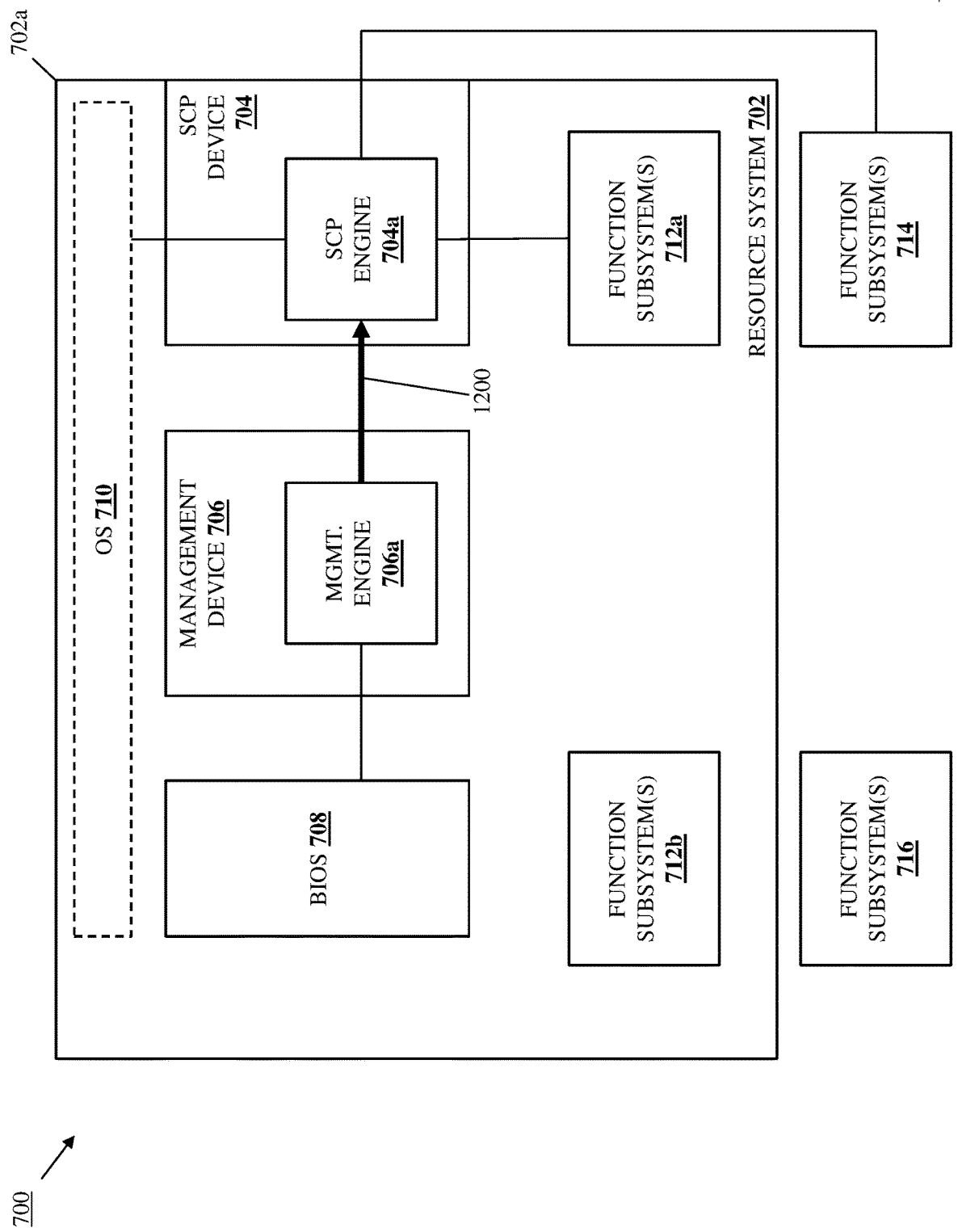
FIG. 12 is a schematic view illustrating an embodiment of the resource system of FIG. 7 operating during the method of FIG. 8.

The method 800 then proceeds to block 806 where the management device provides the BIOS inventory to the trusted orchestrator device. With reference to FIG. 12, in an embodiment of block 806, the management engine 706a in the management device 706 may perform BIOS inventory forwarding operations 1200 that may include forwarding the BIOS inventory received from the BIOS 708 to the SCP engine 704a in the SCP device 704, and while not illustrated or discussed in detail herein, one of skill in the art in possession of the present disclosure will recognize how the SCP engine 704a may store the BIOS inventory in a database provided in a storage system that is included in the SCP device 704 and/or otherwise accessible to the SCP engine 704a. Similarly as discussed above, in many embodiments the provisioning of the BIOS inventory to the SCP device 704 may be performed during the initialization operations for the resource system 702, although some embodiments may include the provisioning of the BIOS inventory to the SCP device 704 during runtime for the resource system 702 and prior or subsequent to the initialization operations discussed herein.

The method 800 then proceeds to decision block 808 where it is determined whether one or more function subsystems in the BIOS inventory match the trusted function subsystem inventory. In an embodiment, at decision block 808, the SCP engine 704a in the SCP device 704 may perform BIOS inventory/trusted function subsystem inventory match determination operations that include comparing the BIOS inventory to the trusted function subsystem inventory to determine whether each of the function subsystem(s) identified in the BIOS inventory match the function subsystems identified in the trusted function subsystem inventory. As discussed above, the trusted function subsystem inventory may define all the function subsystems that may be provided to any operating system provided using the resource system 702, or may define all the function subsystems that may be provided to any particular operating system that is provided using the resource system 702 in order to provide a particular LCS, and one of skill in the art in possession of the present disclosure will appreciate how the SCP engine 704a may determine whether any of the function subsystems that are identified in the BIOS inventory are not identified in the trusted function subsystem inventory (i.e., function subsystems identified in the BIOS inventory that do not match function subsystems identified in the trusted function subsystem inventory). Similarly as discussed above, in many embodiments the BIOS inventory/ trusted function subsystem inventory match determination operations may be performed during the initialization operations for the resource system 702, although some embodiments may include performing the BIOS inventory/trusted function subsystem inventory match determination operations prior or subsequent to the initialization operations discussed herein.

If, at decision block 808, it is determined that one or more function subsystems in the BIOS inventory do not match the trusted function subsystem inventory, the method 800 proceeds to block 810 where the trusted orchestrator device prevents the operating system from utilizing those function subsystem(s). In an embodiment, at block 810 and in response to identifying function subsystem(s) in the BIOS inventory that do not match function subsystem(s) identified in the trusted function subsystem inventory, the SCP engine 704a in the SCP device 704 may perform function subsystem utilization prevention operations in order to prevent the use of those function subsystem(s) by the operating system 710. For example, in some embodiments of block 810, the function subsystem(s) that are identified in the BIOS inventory and not in the trusted function subsystem inventory may introduce a severe enough security issue that the use the resource system 702 may be prevented in order to prevent the operating system 710 from utilizing those function subsystem(s). In other words, particular function subsystem(s) may be defined that, if identified in a BIOS inventory and not in a trusted function subsystem inventory, may result in the SCP device 704 (or an SCPM device that provides the resource management system 304 discussed above with reference to FIG. 3) preventing the use of the resource system 702 to provide the operating system 710 for an LCS.

Figure 13A:
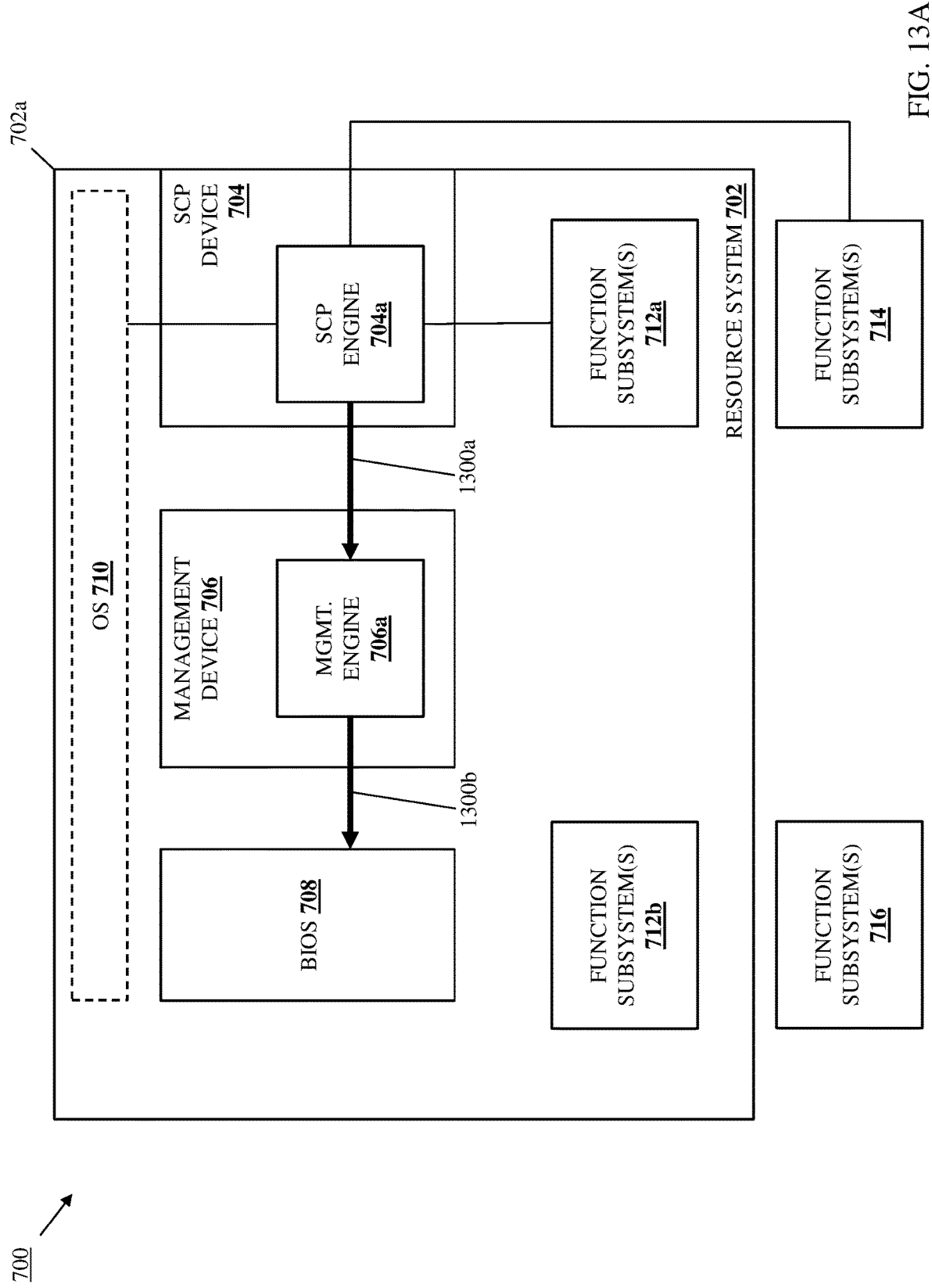
FIG. 13A is a schematic view illustrating an embodiment of the resource system of FIG. 7 operating during the method of FIG. 8.

With reference to FIG. 13A, an embodiment of block 810 is illustrated in which each of the function subsystems 712b and 716 identified in the BIOS inventory do not match the function subsystems identified in the trusted function subsystem inventory and, in response, the SCP engine 704a in the SCP device 704 performs function subsystem utilization prevention operations 1300a that may include providing a function subsystem utilization prevention instruction to the management engine 706a in the management device 706, and the management engine 706a performs function subsystem utilization prevention operations 1300b that may include providing a function subsystem utilization prevention instruction to the BIOS 708. In response to receiving the function subsystem utilization prevention instruction, the BIOS 708 may then prevent the utilization of the function subsystems 712b and 716 by the operating system 710, which is illustrated in FIG. 13A by a lack of coupling of the function subsystems 712b and 716 to the operating system 710. For example, one of skill in the art in possession of the present disclosure will appreciate how the BIOS 708 may prevent the utilization of the function subsystem(s) 712b and 716 by the operating system 710 by ensuring that the function subsystems 712b and 716 are not "visible" to the operating system 710, disabling the function subsystems 712b and 716, and/or performing any other BIOS operations that one of skill in the art in possession of the present disclosure would recognize as preventing function subsystem utilization by an operating system.

As such, the operating system 710 will be prevented from utilizing the function subsystems 712b and 716, which are configured for presentation to the operating system 710 via their coupling to the processing system and/or memory system that provide the operating system in a manner that would otherwise allow the operating system 710 to utilize that function subsystem during runtime of the resource system 702, thus preventing those function subsystems 712b and 716 from being "provided" to that operating system 710. Furthermore, in the event the utilization of any of the function subsystems 712b and 716 by the operating system 710 cannot be prevented, the use of the resource system 702 to provide an LCS may be prevented similarly as described above.

Figure 13B:
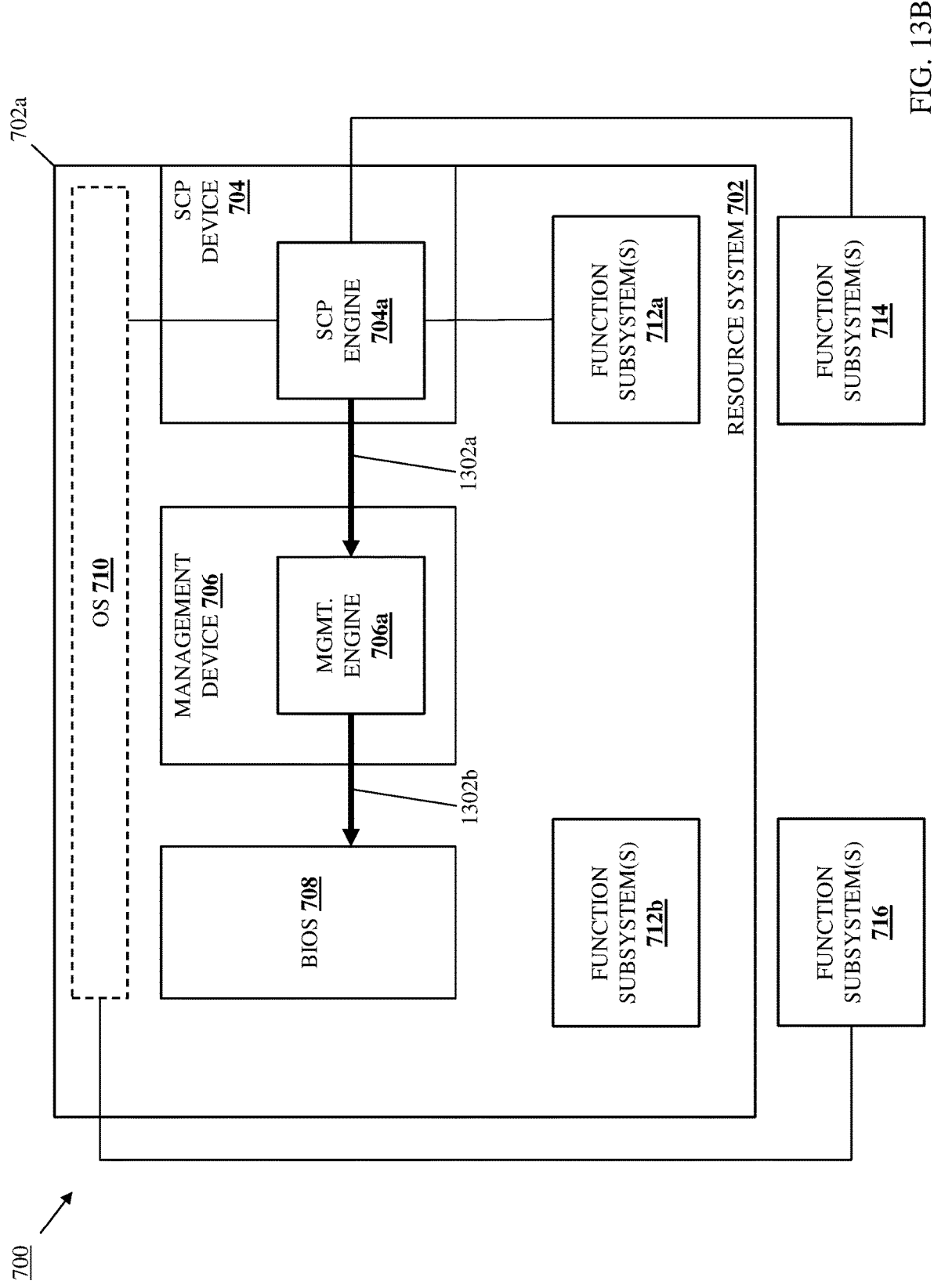
FIG. 13B is a schematic view illustrating an embodiment of the resource system of FIG. 7 operating during the method of FIG. 8.

With reference to FIG. 13B, an embodiment of block 810 is illustrated in which the function subsystem(s) 712b identified in the BIOS inventory do not match the function subsystems identified in the trusted function subsystem inventory and, in response, the SCP engine 704a in the SCP device 704 performs function subsystem utilization prevention operations 1302a that may include providing a function subsystem utilization prevention instruction to the management engine 706a in the management device 706, and the management engine 706a performs function subsystem utilization prevention operations 1302b that may include providing a function subsystem utilization prevention instruction to the BIOS 708. In response to receiving the function subsystem utilization prevention instruction, the BIOS 708 may then prevent the utilization of the function subsystem(s) 712b by the operating system 710, which is illustrated in FIG. 13B by a lack of coupling of the function subsystem(s) 712b to the operating system 710. For example, one of skill in the art in possession of the present disclosure will appreciate how the BIOS 708 may prevent the utilization of the function subsystem(s) 712b by the operating system 710 by ensuring that the function subsystem(s) 712b are not "visible" to the operating system 710, disabling the function subsystem(s) 712b, and/or performing any other BIOS operations one of skill in the art in possession of the present disclosure would recognize as preventing function subsystem utilization by an operating system.

As such, the operating system 710 will be prevented from utilizing the function subsystem(s) 712b, which are configured for presentation to the operating system 710 via their coupling to the processing system and/or memory system that provide the operating system 710 in a manner that would otherwise allow the operating system 710 to utilize that function subsystem during runtime of the resource system 702, thus preventing those function subsystem(s) 712b from being "provided" to that operating system 710. Furthermore, in the event the utilization of any of the function subsystem(s) 712b by the operating system 710 cannot be prevented, the use of the resource system 702 to provide an LCS may be prevented similarly as described above. Further still, if a subset of the function subsystem(s) 712b identified in the BIOS inventory do not match the function subsystems identified in the trusted function subsystem inventory, the utilization of that subset of function subsystem(s) 712b by the operating system 710 may be prevented similarly as described above.

Figure 13C:
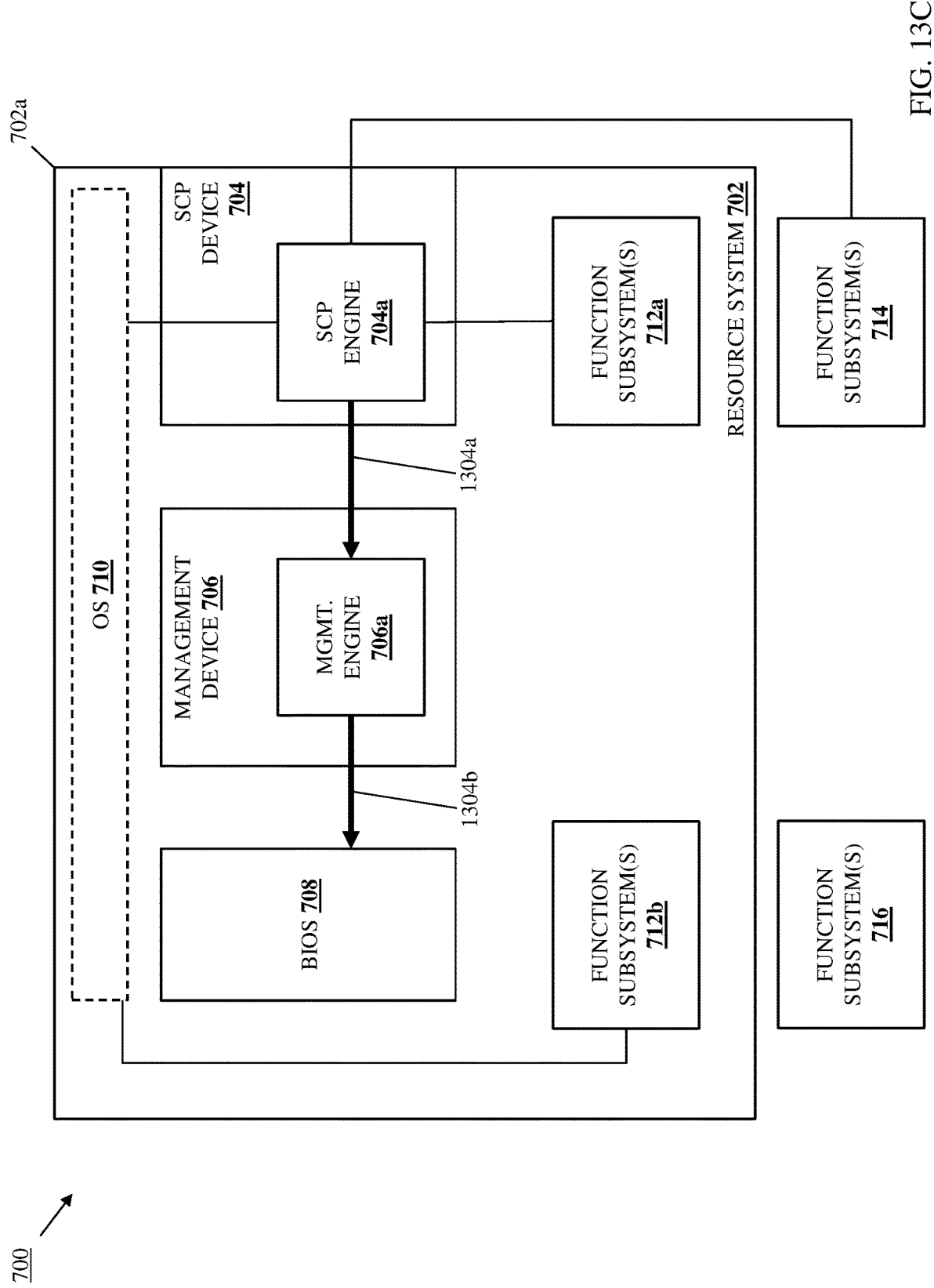
FIG. 13C is a schematic view illustrating an embodiment of the resource system of FIG. 7 operating during the method of FIG. 8.

With reference to FIG. 13C, an embodiment of block 810 is illustrated in which the function subsystem(s) 716 identified in the BIOS inventory do not match the function subsystems identified in the trusted function subsystem inventory and, in response, the SCP engine 704a in the SCP device 704 performs function subsystem utilization prevention operations 1304a that may include providing a function subsystem utilization prevention instruction to the management engine 706a in the management device 706, and the management engine 706a performs function subsystem utilization prevention operations 1304b that may include providing a function subsystem utilization prevention instruction to the BIOS 708. In response to receiving the function subsystem utilization prevention instruction, the BIOS 708 may then prevent the utilization of the function subsystem(s) 716 by the operating system 710, which is illustrated in FIG. 13C by a lack of coupling of the function subsystem(s) 716 to the operating system 710. For example, one of skill in the art in possession of the present disclosure will appreciate how the BIOS 708 may prevent the utilization of the function subsystem(s) 716 by the operating system 710 by ensuring that the function subsystem(s) 716 are not "visible" to the operating system 710, disabling the function subsystem(s) 716, and/or performing any other BIOS operations one of skill in the art in possession of the present disclosure would recognize as preventing function subsystem utilization by an operating system.

As such, the operating system 710 will be prevented from utilizing the function subsystem(s) 716, which are configured for presentation to the operating system 710 via their coupling to the processing system and/or memory system that provide in the operating system 710 in a manner that would otherwise allow the operating system 710 to utilize that function subsystem during runtime of the resource system 702, thus preventing those function subsystem(s) 716 from being "provided" to that operating system 710. Furthermore, in the event the utilization of any of the function subsystem(s) 716 by the operating system 710 cannot be prevented, the use of the resource system 702 to provide an LCS may be prevented similarly as described above. Further still, if a subset of the function subsystem(s) 716 identified in the BIOS inventory do not match the function subsystems identified in the trusted function subsystem inventory, the utilization of that subset of function subsystem(s) 716 by the operating system 710 may be prevented similarly as described above.

If at decision block 808, it is determined that one or more function subsystems in the BIOS inventory match the trusted function subsystem inventory, the method 800 proceeds to block 812 where the trusted orchestrator device allows the operating system to utilize those function subsystem(s). In an embodiment, at block 812 and in response to determining that the function subsystem(s) identified in the BIOS inventory match function subsystem(s) identified in the trusted function subsystem inventory, the SCP engine 704a in the SCP device 704 may perform function subsystem utilization allowance operations in order to allow the use of those function subsystem(s) by the operating system 710. For example, in embodiments in which the method 800 is performed during initialization operations for the resource system 702, block 812 may include (or be followed by) the completion of those initialization operations such that the resource system 702 enters runtime, with the operating system 710 provided and able to utilize the function subsystem(s) identified in the trusted function subsystem inventory.

Figure 13D:
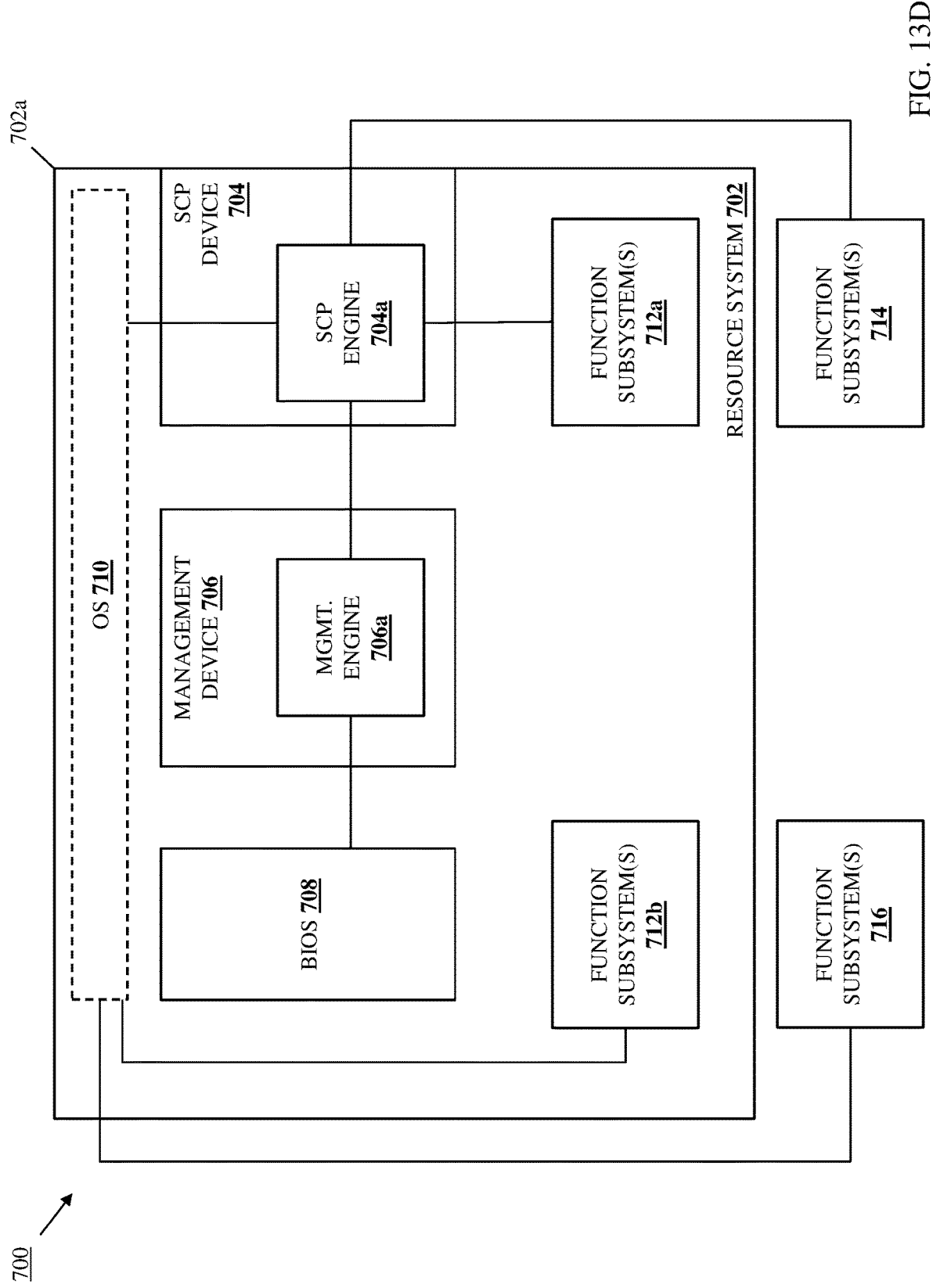
FIG. 13D is a schematic view illustrating an embodiment of the resource system of FIG. 7 operating during the method of FIG. 8.

With reference to FIG. 13D, an embodiment of block 810 is illustrated in which each of the function subsystems 712b and 716 identified in the BIOS inventory match the function subsystems identified in the trusted function subsystem inventory and, in response, the SCP engine 704a in the SCP device 704 performs function subsystem utilization allowance operations that result in the BIOS 708 allowing the utilization of the function subsystems 712b and 716 by the operating system 710, which is illustrated in FIG. 13D by a coupling of the function subsystems 712b and 716 to the operating system 710. Furthermore, one of skill in the art in possession of the present disclosure will appreciate how similar function subsystem utilization allowance operations may result in similar operations by BIOS 708 in the example provided with reference to FIG. 13B (e.g., as illustrated in FIG. 13B by a coupling of the function subsystem(s) 716 to the operating system 710), as well as in the example provided with reference to FIG. 13C (e.g., as illustrated in FIG. 13C by a coupling of the function subsystem(s) 712b to the operating system 710). For example, one of skill in the art in possession of the present disclosure will appreciate how the BIOS 708 may allow the utilization of function subsystem(s) by the operating system 710 by ensuring that the function subsystem(s) are "visible" to the operating system 710, ensuring function subsystem(s) are enabled, and/or performing any other BIOS operations one of skill in the art in possession of the present disclosure would recognize as allowing function subsystem utilization by an operating system.

In the specific examples provided herein, the function subsystem utilization allowance operations "performed" by the SCP device 704 are described as no action being performed by the SCP device 704, with the BIOS 708 defaulting to allowing the utilization of the function subsystem(s) by the operating system 710. However, one of skill in the art in possession of the present disclosure will appreciate how the function subsystem utilization allowance operations may be performed by the SCP device 704 (and the management device 706) via function subsystem utilization allowance instructions that are similar to the function subsystem utilization prevention instructions described in the examples above. As such one of skill in the art in possession of the present disclosure will appreciate how the function subsystem utilization prevention instructions described above may be omitted if the BIOS 708 is configured to default to preventing the utilization of the function subsystem(s) by the operating system 710.

Figure 14:
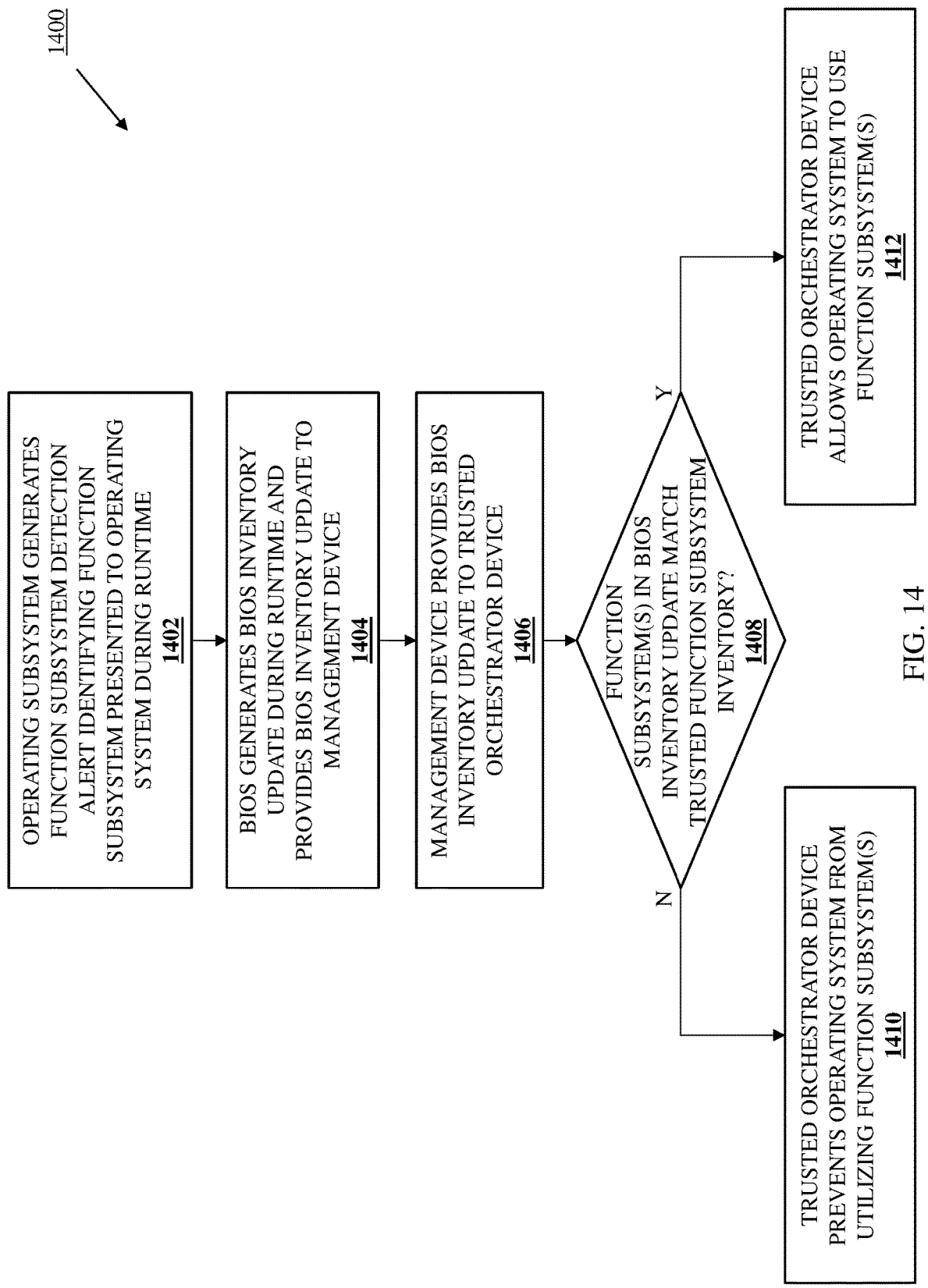
FIG. 14 is a flow chart illustrating an embodiment of a method for inventorying and verifying function subsystems presented to an operating system during runtime.

Referring now to FIG. 14, an embodiment of a method 1400 for inventorying and verifying function subsystems presented to an operating system during runtime operations is illustrated. As discussed below, the systems and methods of the present disclosure provide for the inventorying and verification of function subsystems presented to an operating system for an LCS during runtime and outside the knowledge of a trusted orchestrator device that is intended to "gatekeep" the provisioning of function subsystems to the LCS. For example, the trusted orchestrator function subsystem inventory and verification system of the present disclosure may include an operating system ("OS"), a BIOS, a management device, and a trusted orchestrator device. In response to presentation of a function subsystem to the OS during runtime, the OS generates a function subsystem detection alert that identifies the function subsystem. In response to the function subsystem detection alert, the BIOS generates and provides a BIOS inventory update that identifies the function subsystem. The management device receives the BIOS inventory update and, in response, forwards the BIOS inventory update. The trusted orchestrator device receives the BIOS inventory update and, in response, determines whether the function subsystem identified in the BIOS inventory update is included in a trusted function subsystem inventory. If so, the trusted orchestrator device allows the operating system to utilize the function subsystem while, if not, the trusted orchestrator device prevents the operating system from utilizing the function subsystem. As such, function subsystems presented to an operating system for an LCS during runtime and outside the knowledge of the trusted orchestrator device may be inventoried and verified by the trusted orchestrator device before being provided to that operating system.

Figure 15:
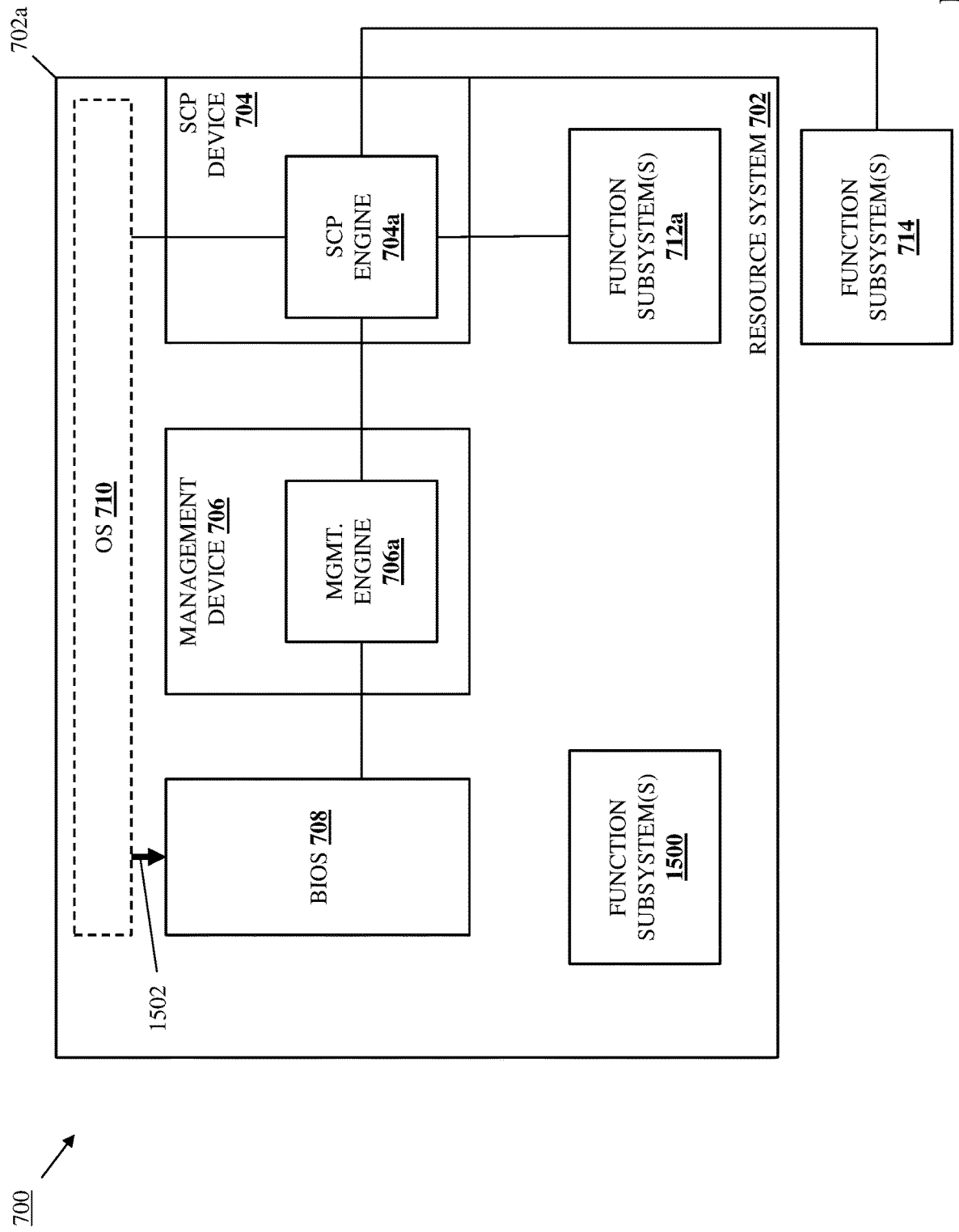
FIG. 15 is a schematic view illustrating an embodiment of the resource system of FIG. 7 operating during the method of FIG. 8.

The method 1400 begins at block 1402 where the operating system generates a function subsystem detection alert identifying a function subsystem presented to the operating system during runtime. With reference to FIG. 15, in an embodiment of block 1402 and during runtime of the resource system 702 (e.g., following initialization operations for the resource system 702 such that the operating system 710 is provided using the resource system 702), one or more function subsystem(s) 1500 may be presented to the operating system 710 and, in response, the operating system 710 may perform function subsystem detection alert generation operations 1502 that include generating a function subsystem detection alert that is provided to the BIOS 708.

For example, at block 1402, a physical function subsystem (e.g., a device) may be coupled to the resource system 702 such that it is presented to the operating system 710, or a virtual function subsystem may be instantiated by a physical function subsystem such that it is coupled to the resource system 702 and presented to the operating system 710. As will be appreciated by one of skill in the art in possession of the present disclosure, the presentation of a function subsystem to the operating system 710 during runtime for the resource system 702 may result from a configuration change to the resource system 702 performed by the SCP device 704, an unauthorized function subsystem coupling to the resource system 702 that allows that function subsystem to present itself to the operating system 710, and/or other function subsystem presentation scenarios that would be apparent to one of skill in the art in possession of the present disclosure. Furthermore, while the function subsystem(s) 1500 are illustrated as being included in the chassis 702a of the resource system 702, one of skill in the art in possession of the present disclosure will appreciate how the function subsystem(s) 1500 may be located outside of the chassis 702a of the resource system 702 and presented to the operating system 710 similarly as described for the function subsystem(s) 716 discussed above.

Similarly as discussed above, a function subsystem may be presented to an operating system if that function subsystem is coupled to the processing system and/or memory system that provide the operating system in any manner that would, absent the systems and methods described herein, allow the operating system to utilize that function subsystem. In an embodiment, the operating system 710 may be configured to detect the presentation of function subsystems to the operating system 710 and, in response, generate a function subsystem detection alert. For example, in response to the presentation of the function subsystem(s) 1500 to the operating system 710, a platform event and/or "hot-plug" event (e.g., the function subsystem detection alert) may be generated by the operating system 710. In a specific example, the function subsystem detection alert may be provided by an Advanced Power and Configuration Interface (ACPI) hot plug event construct that, as discussed below, is configured to trigger the BIOS 708 to generate a BIOS inventory update, although one of skill in the art in possession of the present disclosure will appreciate how the function subsystem detection alert may be provided using other techniques that will fall within the scope of the present disclosure as well.

Figure 16:
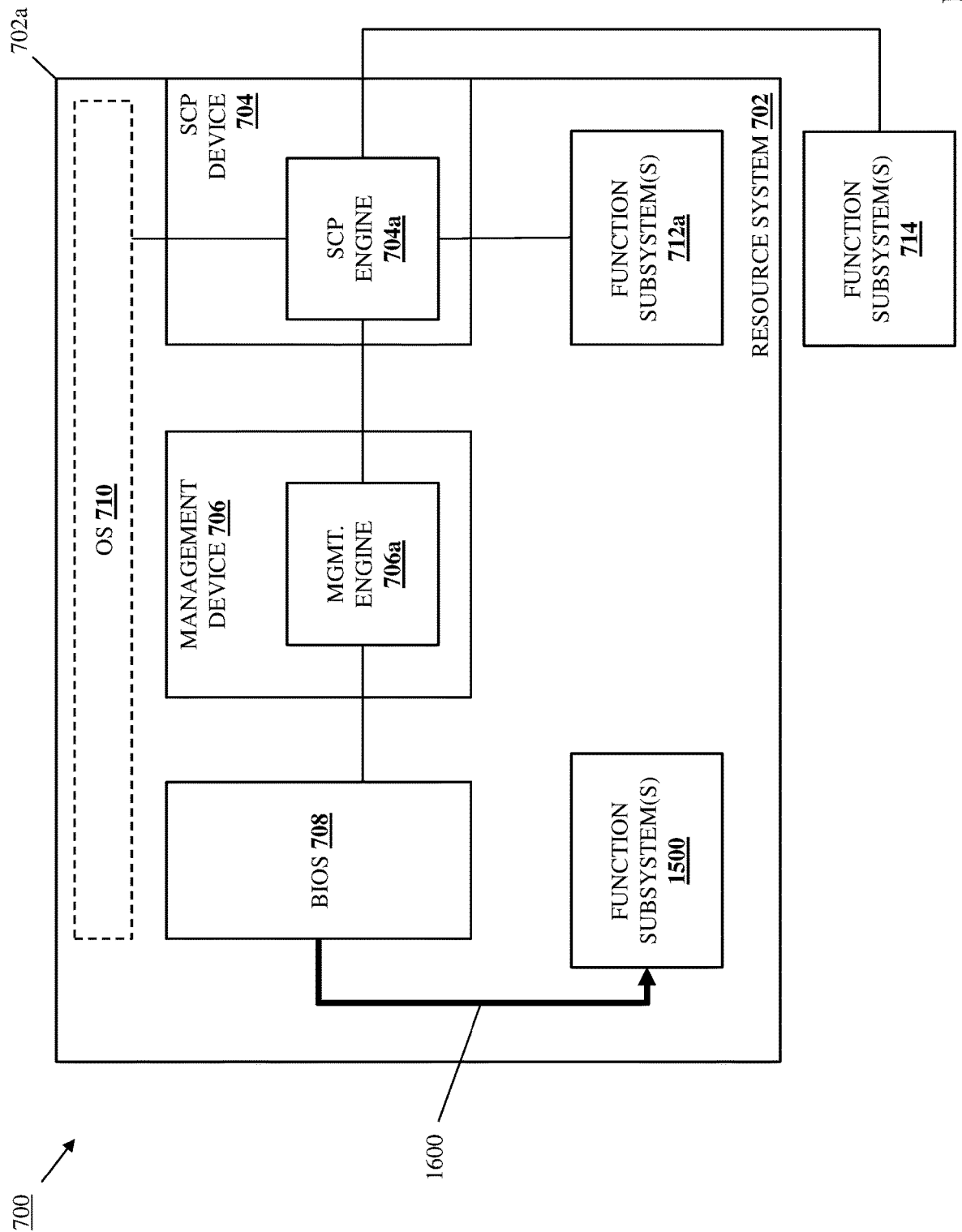
FIG. 16 is a schematic view illustrating an embodiment of the resource system of FIG. 7 operating during the method of FIG. 8.

The method 1400 then proceeds to block 1404 where a BIOS generates a BIOS inventory update during runtime and provides the BIOS inventory to the management device. With reference to FIG. 16, in an embodiment of block 1404, the BIOS 708 may perform BIOS inventory update generation operations 1600 that may include identifying any function subsystems that were not identified in the BIOS inventory generated during the initialization operations discussed above and that are now accessible to the BIOS 708 during runtime of the resource device 702 and, in response, generating a BIOS inventory update that identifies those function subsystems. In the embodiment illustrated in FIG. 16, the BIOS 708 is illustrated as identifying the function subsystem(s) 1500 that are included in the chassis 702a (e.g., that are coupled to a motherboard or other circuit board in the chassis 702a), but as discussed above the BIOS 708 may identify function subsystem(s) that are located outside of the chassis 702a while remaining within the scope of the present disclosure as well.

In a specific example, at block 1404, the BIOS 708 may perform the BIOS inventory update generation operations 1600 that include performing scanning operations (e.g., PCIe device scanning operations) that are configured to identify any physical devices (e.g., PCIe devices), or virtual functions provided by physical devices, that are being presented to the operating system 710 at runtime of the resource system 702 after not having been configured for presentation to the operating system 710 during the initialization operations discussed above. As discussed above, the function subsystem(s) 1500 may be presented to the operating system 710 if the function subsystem(s) 1500 are coupled to the processing system and/or memory system that provide the operating system 710 in any manner that would, absent the systems and methods described herein, allow the operating system to utilize the function subsystem(s) 1500 during runtime of the resource system 702. In an embodiment, the scanning operations discussed above may detect any PCIe device that are presented to the operating system 710 (e.g., via ports connected to the SCP device 704, ports connected to non-SCP devices, etc.). However, while a specific example of a PCIe device scanning operation has been described that identifies PCIe devices and/or functions presented to the operating system, one of skill in the art in possession of the present disclosure will appreciate how different function subsystems may be identified at block 1404 while remaining within the scope of the present disclosure as well.

As such, at block 1404 the BIOS 708 may generate the BIOS inventory update that identifies each of the function subsystems that are accessible to the BIOS 708 and that are presented to the operating system 710 during runtime, and one of skill in the art in possession of the present disclosure will appreciate how the BIOS inventory update may identify those function subsystems using any of a variety of techniques known in the art. As discussed below, some embodiments of block 1404 may result in the generation of a BIOS inventory update that identifies only function subsystems that are also accessible to the SCP device 704, while other embodiments of block 1404 may result in the generation of a BIOS inventory update that identifies at least some function subsystems that are not accessible to the SCP device 704. As discussed above, function subsystems that are not accessible to the SCP device 704 may include networking cards, storage devices, and/or other PCIe devices that are physically connected to connectors on the resource system 702 that are not accessible to the SCP device 704, although one of skill in the art in possession of the present disclosure will appreciate how function subsystems may be inaccessible to the SCP device 704 based on other factors that will fall within the scope of the present disclosure as well.

Figure 17:
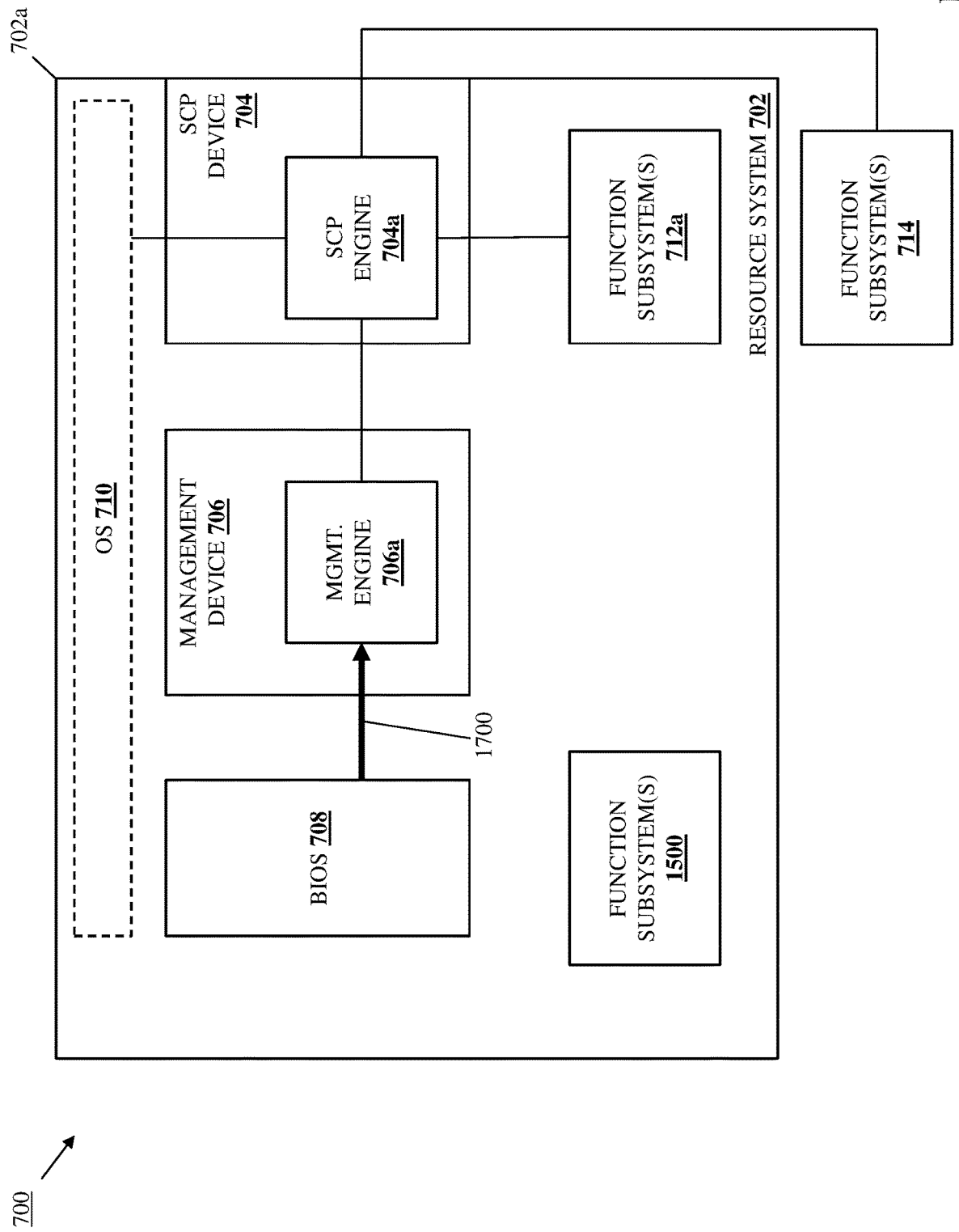
FIG. 17 is a schematic view illustrating an embodiment of the resource system of FIG. 7 operating during the method of FIG. 8.

With reference to FIG. 17, in an embodiment of block 1404, the BIOS 708 may perform BIOS inventory update provisioning operations 1700 that may include providing the BIOS inventory update generated at block 1404 to the management engine 706a in the management device 706, and while not illustrated or discussed in detail herein, one of skill in the art in possession of the present disclosure will recognize how the management engine 706a may store the BIOS inventory update in a database provided in a storage system that is included in the management device 706 and/or otherwise accessible to the management engine 706a.

Figure 18:
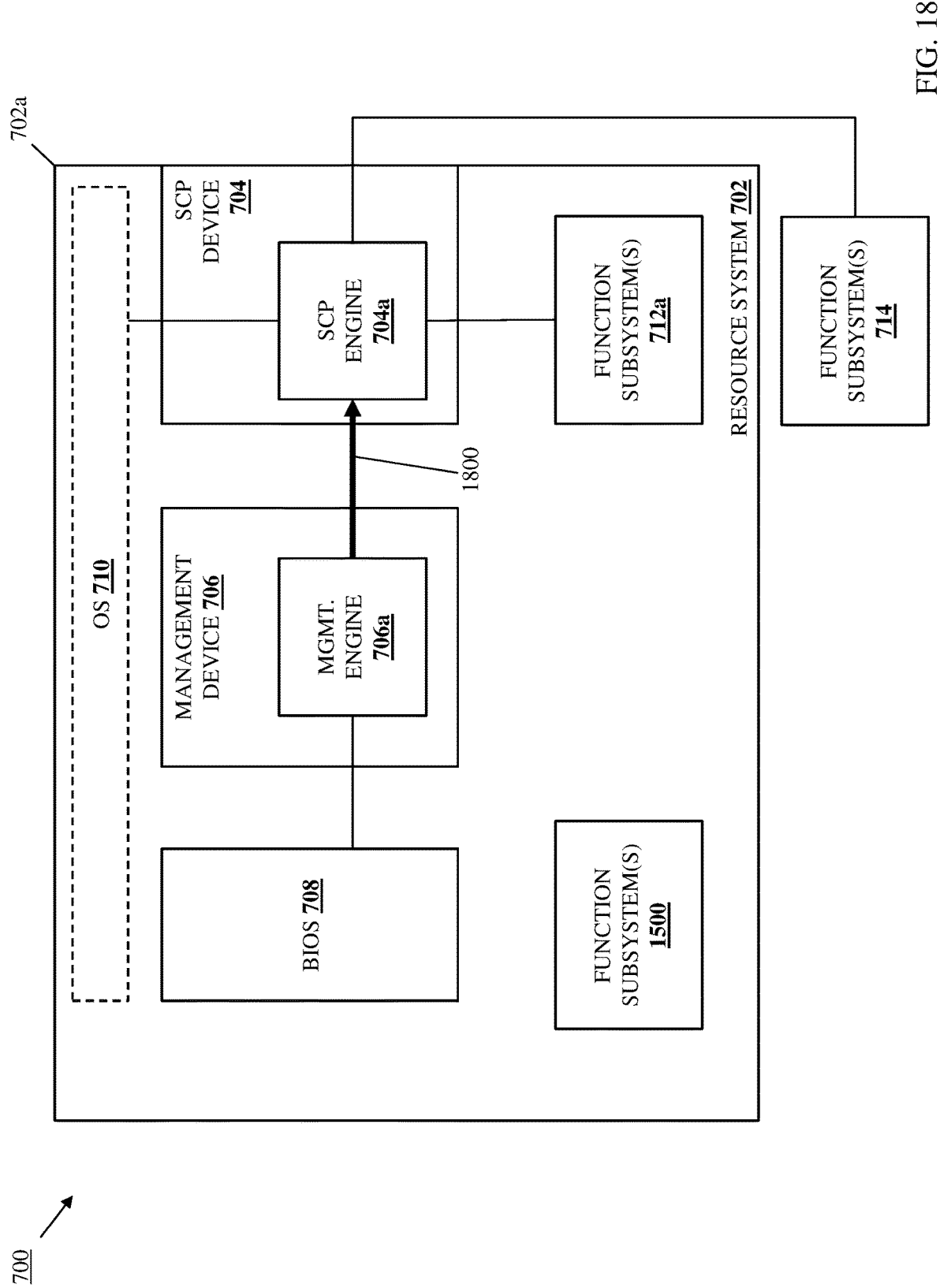
FIG. 18 is a schematic view illustrating an embodiment of the resource system of FIG. 7 operating during the method of FIG. 8.

The method 1400 then proceeds to block 1406 where the management device provides the BIOS inventory update to the trusted orchestrator device. With reference to FIG. 18, in an embodiment of block 1406, the management engine 706a in the management device 706 may perform BIOS inventory forwarding operations 1800 that may include forwarding the BIOS inventory update received from the BIOS 708 to the SCP engine 704a in the SCP device 704, and while not illustrated or discussed in detail herein, one of skill in the art in possession of the present disclosure will recognize how the SCP engine 704a may store the BIOS inventory update in a database provided in a storage system that is included in the SCP device 704 and/or otherwise accessible to the SCP engine 704a.

The method 1400 then proceeds to decision block 1408 where it is determined whether one or more function subsystems in the BIOS inventory update match the trusted function subsystem inventory. In an embodiment, at decision block 1408, the SCP engine 704a in the SCP device 704 may perform BIOS inventory update/trusted function subsystem inventory match determination operations that include comparing the BIOS inventory update to the trusted function subsystem inventory to determine whether each of the function subsystem(s) identified in the BIOS inventory update match the function subsystems identified in the trusted function subsystem inventory. As discussed above, the trusted function subsystem inventory may define all the function subsystems that may be provided to any operating system provided using the resource system 702, or may define all the function subsystems that may be provided to any particular operating system that is provided using the resource system 702 in order to provide a particular LCS, and one of skill in the art in possession of the present disclosure will appreciate how the SCP engine 704a may determine whether any of the function subsystems that are identified in the BIOS inventory update are not identified in the trusted function subsystem inventory (i.e., function subsystems identified in the BIOS inventory update that do not match function subsystems identified in the trusted function subsystem inventory).

If, at decision block 1408, it is determined that one or more function subsystems in the BIOS inventory update do not match the trusted function subsystem inventory, the method 1400 proceeds to block 1410 where the trusted orchestrator device prevents the operating system from utilizing those function subsystem(s). In an embodiment, at block 1410 and in response to identifying function subsystem(s) in the BIOS inventory update that do not match function subsystem(s) identified in the trusted function subsystem inventory, the SCP engine 704*a* in the SCP device 704 may perform function subsystem utilization prevention operations in order to prevent the use of those function subsystem(s) by the operating system 710. For example, in some embodiments of block 1410, the function subsystem(s) that are identified in the BIOS inventory update and not in the trusted function subsystem inventory may introduce a severe enough security issue that the use the resource system 702 may be prevented in order to prevent the operating system 710 from utilizing those function subsystem(s). In other words, particular function subsystems may be defined that, if identified in a BIOS inventory update and not in a trusted function subsystem inventory, may result in the SCP device 704 (or an SCPM device that provides the resource management system 304 discussed above with reference to FIG. 3) preventing the use of the resource system 702 to provide the operating system 710 for an LCS.

Figure 19A:
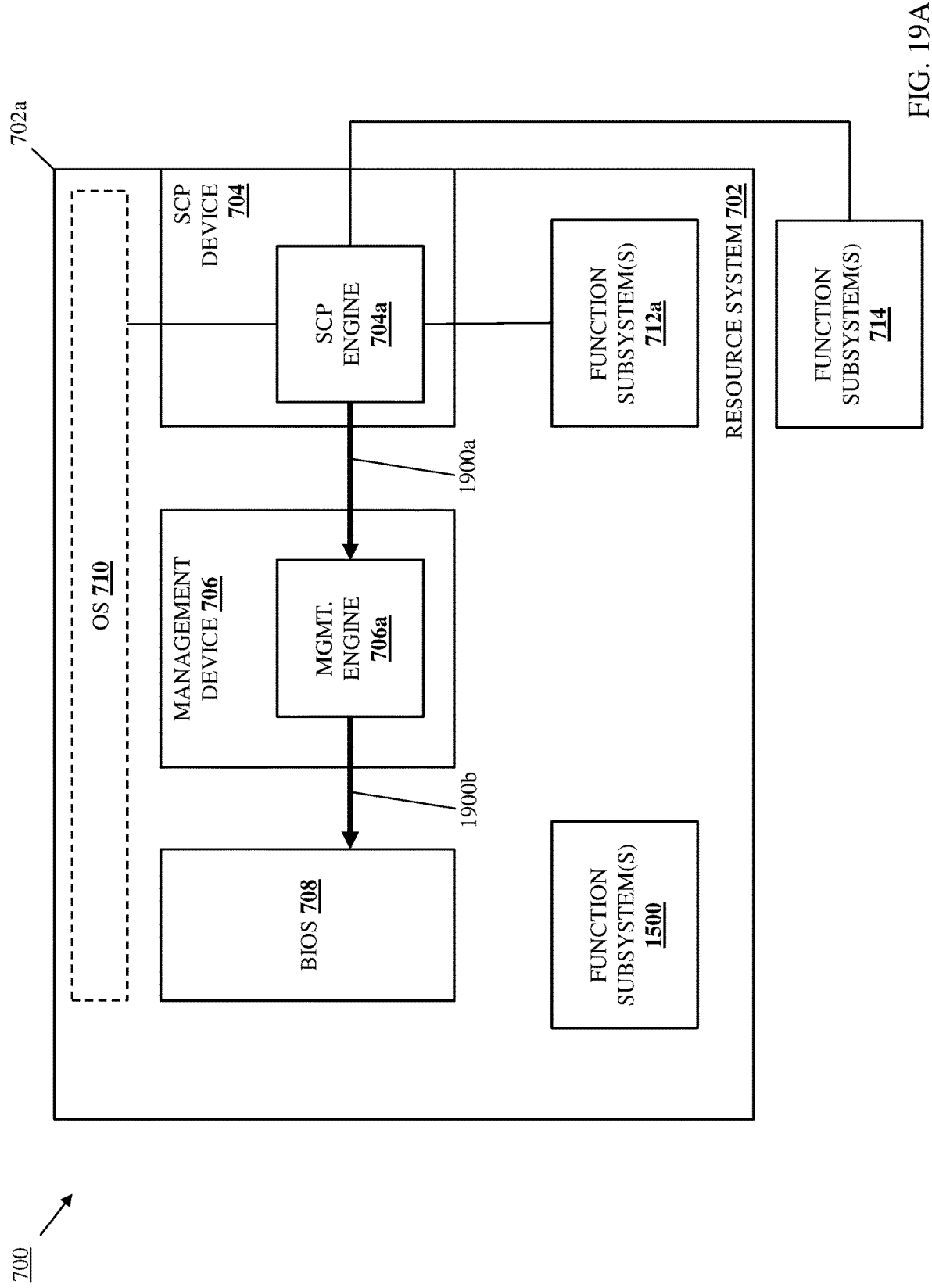
FIG. 19A is a schematic view illustrating an embodiment of the resource system of FIG. 7 operating during the method of FIG. 8.

With reference to FIG. 19A, an embodiment of block 1410 is illustrated in which the function subsystem(s) 1500 identified in the BIOS inventory update do not match the function subsystems identified in the trusted function subsystem inventory and, in response, the SCP engine 704*a* in the SCP device 704 performs function subsystem utilization prevention operations 1900*a* that may include providing a function subsystem utilization prevention instruction to the management engine 706*a* in the management device 706, and the management engine 706*a* performs function subsystem utilization prevention operations 1900*b* that may include providing a function subsystem utilization prevention instruction to the BIOS 708. In response to receiving the function subsystem utilization prevention instruction, the BIOS 708 may then prevent the utilization of the function subsystem(s) 1500 by the operating system 710, which is illustrated in FIG. 19A by a lack of coupling of the function subsystem(s) 1500 to the operating system 710. For example, one of skill in the art in possession of the present disclosure will appreciate how the BIOS 708 may prevent the utilization of the function subsystem(s) 1500 by the operating system 710 by ensuring that the function subsystem(s) 1500 are not "visible" to the operating system 710, disabling the function subsystem(s) 1500, and/or performing any other BIOS operations that one of skill in the art in possession of the present disclosure would recognize as preventing function subsystem utilization by an operating system.

As such, the operating system 710 will be prevented from utilizing the function subsystem(s) 1500, which are presented to the operating system 710 via their coupling to the processing system and/or memory system that provide the operating system in a manner that would otherwise allow the operating system 710 to utilize the function subsystem(s) 1500 during runtime of the resource system 702, thus preventing those function subsystem(s) 1500 from being "provided" to that operating system 710. Furthermore, in the event the utilization of any of the function subsystem(s) 1500 by the operating system 710 cannot be prevented, the use of the resource system 702 to provide an LCS may be prevented similarly as described above.

If at decision block 1408, it is determined that the function subsystems in the BIOS inventory update match the trusted function subsystem inventory, the method 1400 proceeds to block 1412 where the trusted orchestrator device allows the operating system to utilize those function subsystem(s). In an embodiment, at block 1412 and in response to determining that the function subsystem(s) identified in the BIOS inventory update match function subsystem(s) identified in the trusted function subsystem inventory, the SCP engine 704*a* in the SCP device 704 may perform function subsystem utilization allowance operations in order to allow the use of those function subsystem(s) by the operating system 710.

Figure 19B:
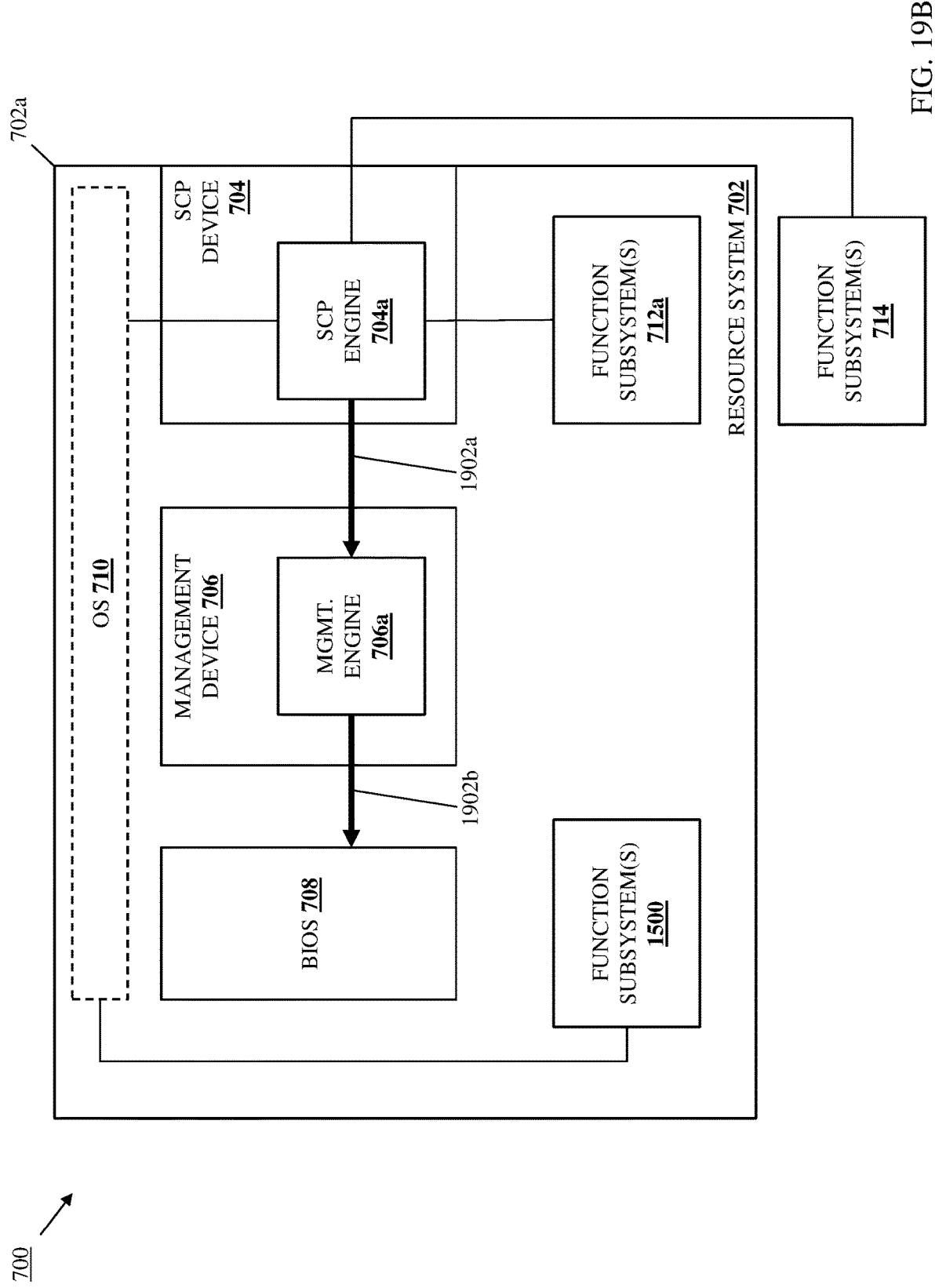
FIG. 19B is a schematic view illustrating an embodiment of the resource system of FIG. 7 operating during the method of FIG. 8.

With reference to FIG. 19B, an embodiment of block 1410 is illustrated in which the function subsystem(s) 1500 identified in the BIOS inventory update match the function subsystems identified in the trusted function subsystem inventory and, in response, the SCP engine 704*a* in the SCP device 704 performs function subsystem utilization allowance operations that result in the BIOS 708 allowing the utilization of the function subsystem(s) 1500 by the operating system 710, which is illustrated in FIG. 19B by a coupling of the function subsystem(s) 1500 to the operating system 710. For example, one of skill in the art in possession of the present disclosure will appreciate how the BIOS 708 may allow the utilization of the function subsystem(s) 1500 by the operating system 710 by ensuring that the function subsystem(s) 1500 are "visible" to the operating system 710, ensuring the function subsystem(s) 1500 are enabled, and/or performing any other BIOS operations one of skill in the art in possession of the present disclosure would recognize as allowing function subsystem utilization by an operating system.

In the specific examples provided herein, the function subsystem utilization allowance operations "performed" by the SCP device 704 are described as no action being performed by the SCP device 704, with the BIOS 708 defaulting to allowing the utilization of the function subsystem(s) 1500 by the operating system 710. However, one of skill in the art in possession of the present disclosure will appreciate how the function subsystem utilization allowance operations may be performed by the SCP device 704 (and the management device 706) via function subsystem utilization allowance instructions that are similar to the function subsystem utilization prevention instructions described in the examples above. As such, one of skill in the art in possession of the present disclosure will appreciate how the function subsystem utilization prevention instructions described above may be omitted if the BIOS 708 is configured to default to preventing the utilization of the function subsystem(s) by the operating system 710.

Thus, systems and methods have been described that provide for the inventorying and verification of function subsystems presented to an operating system for an LCS during initialization operations or runtime and outside the knowledge of a trusted orchestrator device that is intended to "gatekeep" the provisioning of function subsystems to the LCS. As such, function subsystems presented to an operating system for an LCS during initialization operations or runtime and outside the knowledge of the trusted orchestrator device may be inventoried and verified by the trusted orchestrator device before being provided to that operating system, thus ensuring that the operating system only utilizes functions subsystems defined by a network administrator for utilization by the operating system. In a specific example, the trusted function subsystem inventory may identify function subsystems for which a license has been purchased for use with an LCS, and thus the system and methods of the present disclosure may ensure that an operating system providing an LCS only utilizes licensed function subsystems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A trusted orchestrator function subsystem inventory and verification system, comprising:
    an operating system that is configured, in response to presentation of a function subsystem to the operating system during runtime, to generate a function subsystem detection alert that identifies the function subsystem;
    a Basic Input/Output System (BIOS) that is coupled to the operating system and that is configured, in response to the function subsystem detection alert, to generate and provide a BIOS inventory update that identifies the function subsystem;
    a management device that is coupled to the BIOS and that includes at least one management processor that is configured to receive the BIOS inventory update and, in response, forward the BIOS inventory update; and
    a trusted orchestrator device that is coupled to the management device and that includes at least one trusted orchestrator processor that is configured to receive the BIOS inventory update, determine whether the function subsystem identified in the BIOS inventory update is included in a trusted function subsystem inventory, and:
        in response to the function subsystem being included in the trusted function subsystem inventory, allow the operating system to utilize the function subsystem; and
        in response to the function subsystem not being included in the trusted function subsystem inventory, prevent the operating system from utilizing the function subsystem.

2. The system of claim 1, wherein the operating system is provided via a Bare Metal Server (BMS) system and configured as part of a Logically Composed System (LCS), the BIOS is included in the BMS system, the management device is included in the BMS system, and the trusted orchestrator device is included in the BMS system.

3. The system of claim 1, wherein the operating system is configured to detect the presentation of the function subsystem to the operating system during runtime via detection of a hot-plug event associated with the function subsystem.

4. The system of claim 1, wherein the trusted orchestrator device is a System Control Processor (SCP) device.

5. The system of claim 1, wherein the BIOS is configured, during initialization operations that are prior to the runtime, to generate a BIOS inventory, and provide the BIOS inventory to the management device.

6. The system of claim 5, wherein the at least one management processor in the management device is configured, during the initialization operations, to receive the BIOS inventory and forward the BIOS inventory to the trusted orchestrator device, and wherein the at least one trusted orchestrator processor in the trusted orchestrator device is configured, during the initialization operations, to prevent the operating system from utilizing any function subsystem that is identified in the BIOS inventory and not in the trusted function subsystem inventory.

7. A Bare Metal Server (BMS) system, comprising:
    a Bare Metal Server (BMS) chassis;
        a processing system that is included in the BMS chassis;
        a memory system that is included in the BMS chassis, that is coupled to the processing system, and that includes instructions that, when executed by the processing system, cause the processing system to provide an operating system that is configured as part of a Logically Composed System (LCS) and that, in response to presentation of a function subsystem to the operating system during runtime, generates a function subsystem detection alert that identifies the function subsystem;
        a Basic Input/Output System (BIOS) that is included in the BMS chassis, that is coupled to the processing system, and that is configured, in response to the function subsystem detection alert, to generate and provide a BIOS inventory update that identifies the function subsystem;
        a management device that is included in the BMS chassis, that is coupled to the BIOS, and that includes at least one management processor that is configured to receive the BIOS inventory update and, in response, forward the BIOS inventory update; and
        a trusted orchestrator device that is included in the BMS chassis, that is coupled to the management device, and that includes at least one trusted orchestrator processor that is configured to receive the BIOS inventory update, determine whether the function subsystem identified in the BIOS inventory update is included in a trusted function subsystem inventory, and:
            in response to the function subsystem being included in the trusted function subsystem inventory, allow the operating system to utilize the function subsystem; and
            in response to the function subsystem not being included in the trusted function subsystem inventory, prevent the operating system from utilizing the function subsystem.

8. The BMS system of claim 7, wherein the operating system is configured to detect the presentation of the function subsystem to the operating system during runtime via detection of a hot-plug event associated with the function subsystem.

9. The BMS system of claim 8, wherein the hot-plug event is an Advanced Configuration and Power Interface (ACPI) hot-plug event that is configured to cause the generation of the BIOS inventory update.

10. The BMS system of claim 7, wherein the trusted orchestrator device is a System Control Processor (SCP) device.

11. The BMS system of claim 7, wherein the BIOS is configured, during initialization operations that are prior to the runtime, to generate a BIOS inventory and provide the BIOS inventory to the management device.

12. The BMS system of claim 11, wherein the at least one management processor in the management device is configured, during the initialization operations, to receive the BIOS inventory and forward the BIOS inventory to the trusted orchestrator device.

13. The BMS system of claim 12, wherein the at least one trusted orchestrator processor in the trusted orchestrator device is configured, during the initialization operations, to:

allow the operating system to utilize any function subsystem that is identified in the BIOS inventory and in the trusted function subsystem inventory; and prevent the operating system from utilizing any function subsystem that is identified in the BIOS inventory and not in the trusted function subsystem inventory.

14. A method for inventorying and verifying function subsystems presented to an operating system, comprising:

generating, by an operating system in response to presentation of a function subsystem to the operating system during runtime, a function subsystem detection alert that identifies the function subsystem;

generating, by a Basic Input/Output System (BIOS) that is coupled to the operating system in response to the function subsystem detection alert, a BIOS inventory update that identifies the function subsystem;

providing, by the BIOS, the BIOS inventory update;

receiving, by at least one management processor in a management device that is coupled to the BIOS, the BIOS inventory update;

forwarding, by the at least one management processor in the management device, the BIOS inventory update;

receiving, by at least one trusted orchestrator processor in a trusted orchestrator device that is coupled to the management device, the BIOS inventory update;

determining, by the at least one trusted orchestrator processor in the trusted orchestrator device, whether the function subsystem identified in the BIOS inventory update is included in a trusted function subsystem inventory; and allowing, by the at least one trusted orchestrator processor in the trusted orchestrator device in response to the function subsystem being included in the trusted function subsystem inventory, the operating system to utilize the function subsystem; and preventing, by the at least one trusted orchestrator processor in the trusted orchestrator device in response to the function subsystem not being included in the trusted function subsystem inventory, the operating system from utilizing the function subsystem.

15. The method of claim 14, wherein the operating system is provided via a Bare Metal Server (BMS) system and configured as part of a Logically Composed System (LCS), the BIOS is included in the BMS system, the management device is included in the BMS system, and the trusted orchestrator device is included in the BMS system.

16. The method of claim 14, wherein the detecting the presentation of the function subsystem to the operating system during runtime is performed via detection of a hot-plug event associated with the function subsystem.

17. The method of claim 14, wherein the trusted orchestrator device is a System Control Processor (SCP) device.

18. The method of claim 14, further comprising:

generating, by the BIOS during initialization operations that are prior to the runtime, a BIOS inventory;

providing, by the BIOS during the initialization operations, the BIOS inventory to the management device.

19. The method of claim 18, further comprising:

receiving, by the at least one management processor in the management device during the initialization operations, the BIOS inventory; and forwarding, by the at least one management processor in the management device during the initialization operations, the BIOS inventory to the trusted orchestrator device.

20. The method of claim 19, further comprising:

allowing, by the at least one trusted orchestrator processor in the trusted orchestrator device during the initialization operations, the operating system to utilize any function subsystem that is identified in the BIOS inventory and in the trusted function subsystem inventory; and preventing, by the at least one trusted orchestrator processor in the trusted orchestrator device during the initialization operations, the operating system from utilizing any function subsystem that is identified in the BIOS inventory and not in the trusted function subsystem inventory.

* * * * *